US012783106B2

(12) United States Patent
Kyung et al.

(10) Patent No.: US 12,783,106 B2
(45) Date of Patent: Nov. 3, 2026

(54) ELECTRONIC DEVICE, METHOD AND NON-TRANSITORY COMPUTER-READABLE STORAGE MEDIUM DISPLAYING USER INTERFACE FOR CONTEXT-SPECIFIC SETTINGS

(71) Applicant: SAMSUNG ELECTRONICS CO., LTD., Suwon-si (KR)

(72) Inventors: Sunghyun Kyung, Suwon-si (KR); Siyoung Kim, Suwon-si (KR); Jeonghu Na, Suwon-si (KR); Myeongeum Yoo, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/176,938

(22) Filed: Apr. 11, 2025

(65) Prior Publication Data

US 2025/0238119 A1 Jul. 24, 2025

Related U.S. Application Data

(63) Continuation of application No. PCT/KR2023/015470, filed on Oct. 6, 2023.

(30) Foreign Application Priority Data

Oct. 11, 2022 (KR) ........................ 10-2022-0130102
Dec. 1, 2022 (KR) ........................ 10-2022-0165499

(51) Int. Cl.

| | |
|---|---|
| ***G06F 3/0482*** | (2013.01) |
| ***G06F 3/04847*** | (2022.01) |
| ***G06F 3/0488*** | (2022.01) |

(52) U.S. Cl.
CPC ........ *G06F 3/0482* (2013.01); *G06F 3/04847* (2013.01); *G06F 3/0488* (2013.01)

(58) Field of Classification Search
None
See application file for complete search history.

(56) References Cited

U.S. PATENT DOCUMENTS 7,137,073 B2 11/2006 Kim et al.
8,479,102 B2 7/2013 Son et al.
(Continued)

FOREIGN PATENT DOCUMENTS

KR 10-2006-0072897 A 6/2006
KR 10-2013-0000633 A 1/2013
(Continued)

OTHER PUBLICATIONS

International Search Report (PCT/ISA/210) issued by the International Searching Authority on Jan. 23, 2024 in corresponding International Application No. PCT/KR2023/015470.
(Continued)

*Primary Examiner* — Nitin Patel
*Assistant Examiner* — Amen W Bogale
(74) *Attorney, Agent, or Firm* — Sughrue Mion, PLLC

(57) ABSTRACT

An electronic device is provided. A processor of the electronic device can be configured to display, via the display, an executable object for displaying a user interface for context-specific setting, as partially transparent on a screen; receive an input on the screen, the input being associated with the executable object; based on the input, identify, from among setting menus for global setting, a setting menu corresponding to a function associated with an object, in the screen, the object being visible on the screen under the executable object; identify, from among settings in the setting menu, a setting corresponding to data obtained via the at least one
(Continued)

sensor; and display, via the display, the user interface, the user interface comprising an item for adjusting a value of the setting as partially transparent on the screen.

20 Claims, 24 Drawing Sheets

(56) References Cited

U.S. PATENT DOCUMENTS

| | | | | |
|---|---|---|---|---|
| 8,897,492 | B2 | 11/2014 | Chou et al. | |
| 9,600,145 | B2 | 3/2017 | Jeon et al. | |
| 9,635,432 | B2 | 4/2017 | Han et al. | |
| 9,880,700 | B2 | 1/2018 | Smoak et al. | |
| 10,380,614 | B1 * | 8/2019 | Battre | G06F 16/951 |
| 11,442,604 | B2 | 9/2022 | Miller et al. | |
| 2014/0210744 | A1 * | 7/2014 | Song | G06F 3/04883 345/173 |
| 2015/0378600 | A1 | 12/2015 | Sloan et al. | |
| 2018/0188951 | A1 | 7/2018 | Kim et al. | |
| 2018/0335928 | A1 * | 11/2018 | Van Os | G06Q 20/204 |
| 2018/0335936 | A1 * | 11/2018 | Missig | G06F 3/02 |
| 2020/0326841 | A1 * | 10/2020 | Griffin | G06F 3/04883 |
| 2021/0112152 | A1 | 4/2021 | Omernick et al. | |
| 2022/0070247 | A1 * | 3/2022 | Wang | G06F 3/0482 |
| 2022/0083211 | A1 * | 3/2022 | Nefulda | G06F 3/016 |
| 2023/0386382 | A1 * | 11/2023 | Cai | G09G 3/20 |

FOREIGN PATENT DOCUMENTS

| | | | |
|---|---|---|---|
| KR | 10-2014-0102068 | A | 8/2014 |
| KR | 10-1772640 | B1 | 8/2017 |
| KR | 10-2018-0080484 | A | 7/2018 |
| KR | 10-1954167 | B1 | 3/2019 |
| KR | 10-2138505 | B1 | 7/2020 |
| KR | 10-2214097 | B1 | 2/2021 |

OTHER PUBLICATIONS

Written Opinion (PCT/ISA/237) issued by the International Searching Authority on Jan. 23, 2024 in corresponding International Application No. PCT/KR2023/015470.

* cited by examiner

ELECTRONIC DEVICE, METHOD AND NON-TRANSITORY COMPUTER-READABLE STORAGE MEDIUM DISPLAYING USER INTERFACE FOR CONTEXT-SPECIFIC SETTINGS

CROSS-REFERENCES TO RELATED APPLICATIONS

This application is a bypass continuation application of International Application No. PCT/KR2023/015470, filed on Oct. 6, 2023, in the Korean Intellectual Property Office, which claims priority from Korean Patent Application No. 10-2022-0130102, filed on Oct. 11, 2022, in the Korean Intellectual Property Office, and Korean Patent Application No. 10-2022-0165499, filed on Dec. 1, 2022, in the Korean Intellectual Property Office, the disclosure of which are incorporated herein by reference in their entireties.

FIELD

The following descriptions relate to an electronic device, a method, and a non-transitory computer readable storage medium displaying a user interface for context-specific setting.

BACKGROUND

An electronic device may provide multiple functions. For example, in the electronic device, multiple operations may be executed for phone calls, video conversations, sending and receiving emails, games, chatting, navigation, health management, scheduling, recording, listening to music, watching movies, online shopping, flashlight, level, and displaying web pages.

SUMMARY

An electronic device is provided. The electronic device may comprise at least one sensor. The electronic device may comprise a display. The electronic device may comprise a processor including processing circuitry. The electronic device may include one or more storage media storing instructions. The instructions, when executed by the at least one processor individually or collectively, cause the electronic device to display, via the display, an executable object for displaying a user interface for context-specific setting, as partially transparent on a screen; receive an input on the screen, the input being associated with the executable object; based on the input, identify, from among setting menus for global setting, a setting menu corresponding to a function associated with an object, in the screen, the object being visible on the screen under the executable object; identify, from among settings in the setting menu, a setting corresponding to data obtained via the at least one sensor; and display, via the display, the user interface, the user interface comprising an item for adjusting a value of the setting as partially transparent on the screen.

A method is provided. The method may be executed in an electronic device including at least one sensor and a display. The method may include displaying, via the display, an executable object for displaying a user interface for context-specific setting, as partially transparent on a screen; receiving an input on the screen, the input being associated with the executable object; based on the input, identifying, from among setting menus for global setting, a setting menu corresponding to a function associated with an object, in the screen, the object being visible on the screen under the executable object; identifying, from among settings in the setting menu, a setting corresponding to data obtained via the at least one sensor; and displaying, via the display, the user interface, the user interface comprising including an item for adjusting a value of the setting, as partially transparent on the screen.

A non-transitory computer readable storage medium is provided. The non-transitory computer readable storage medium may store one or more instructions. The one or more instructions, when executed by a processor of an electronic device including a display and at least one sensor, cause the processor to display, via the display, an executable object for displaying a user interface for context-specific setting, as partially transparent on a screen; receive an input on the screen, the input being associated with the executable object; based on the input, identify, from among setting menus for global setting, a setting menu corresponding to a function associated with an object, in the screen, the object being visible on the screen under the executable object; identify, from among settings in the setting menu, a setting corresponding to data obtained via the at least one sensor; and display, via the display, the user interface, the user interface comprising an item for adjusting a value of the setting, as partially transparent on the screen.

DETAILED DISCLOSURE

Figure 1:
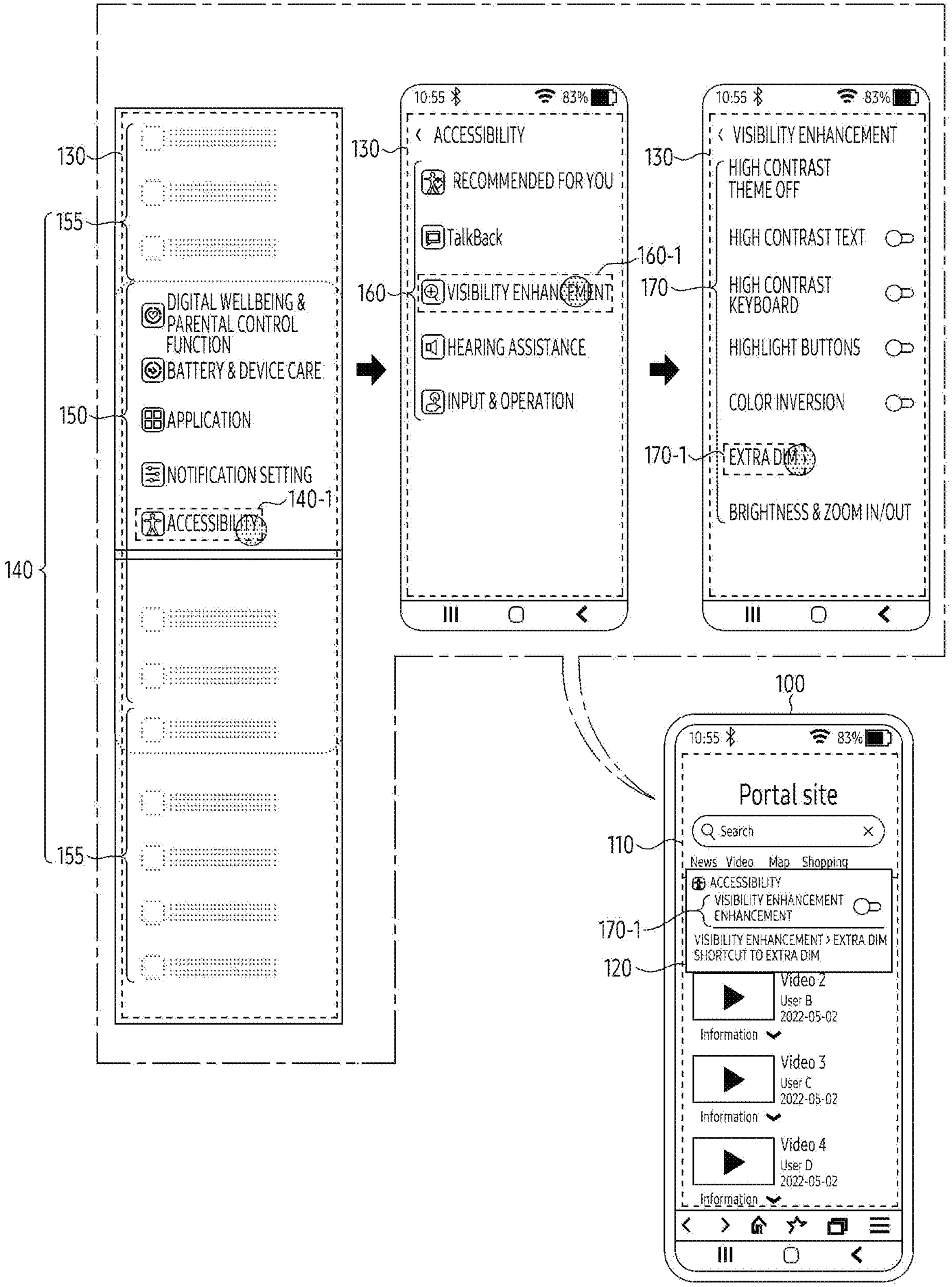
FIG. 1 illustrates an exemplary electronic device displaying a user interface for context-specific setting.

FIG. 1 illustrates an exemplary electronic device displaying a user interface for context-specific setting.

Referring to FIG. 1, an electronic device 100 may display a user interface 120 partially superimposed on a screen 110. For example, the user interface 120 may be superimposed on the screen 110 for context-specific setting. For example, the context-specific setting may indicate a setting that corresponds to the screen 110, at least a portion of objects in the screen 110, a state of the electronic device 100 displaying the screen 110, and/or a state around the electronic device 100 displaying the screen 110. For example, the context-specific setting may be identified among a plurality of settings within setting menus for a global setting indicating a setting applied to all domains of the electronic device 100.

For example, the global setting may be provided via another user interface 130. For example, the other user interface 130 may include setting menus 140. For example, since the electronic device 100 is a device providing multiple functions, the number of setting menus 140 categorizing operations for the multiple functions may be large. For example, the electronic device 100 may display a portion 150 of the setting menus 140 within the other user interface 130. For example, a remaining portion 155 of the setting menus 140 may not be displayed while the portion 150 of the setting menus 140 is displayed within the other user interface 130. For example, the remaining portion 155 of the setting menus 140 may be displayed within the other user interface 130, in response to a scroll input to the other user interface 130 including the portion 150 of the setting menus 140. For example, since the remaining portion 155 of the setting menus 140 displayed in response to the scroll input may not be recognized by a user, searching for one of the setting menus 140 using the other user interface 130 may cause inconvenience.

For example, since the electronic device 100 is a device providing multiple functions, the number of settings included in each of the setting menus 140 may be very large. For example, a setting menu 140-1 may include sub-setting menus 160 categorizing the settings, and each of the sub-setting menus 160 may include a portion of the settings. For example, a sub-setting menu 160-1 may include settings 170. For example, the other user interface 130 may have a hierarchical structure with multiple layers. For example, a user input for displaying the other user interface 130, a user input indicating to select the setting menu 140-1 among the setting menus 140, a user input indicating to select the sub-setting menu 160-1 among the sub-setting menus 160, and a user input selecting a setting 170-1 among settings 170 may be received to access the setting 170-1. For example, since the setting 170-1 is included in the sub-setting menu 160-1 in the setting menu 140-1, the setting 170-1 may not be recognized by the user. For example, even when the setting 170-1 is recognized by the user, accessing the setting 170-1 using the multiple user inputs may cause inconvenience.

For example, the electronic device 100 may identify a situation, and provide, within the user interface 120 for the context-specific setting, the setting 170-1 identified based on the situation. For example, the electronic device 100 may provide a service accessing the setting 170-1 via a simplified user input. For example, the electronic device 100 may provide a service that changes a configuration of the other user interface 130 to a configuration corresponding to user preference.

For example, the electronic device 100 may include components for providing these services. The components may be exemplified through FIG. 2.

Figure 2:
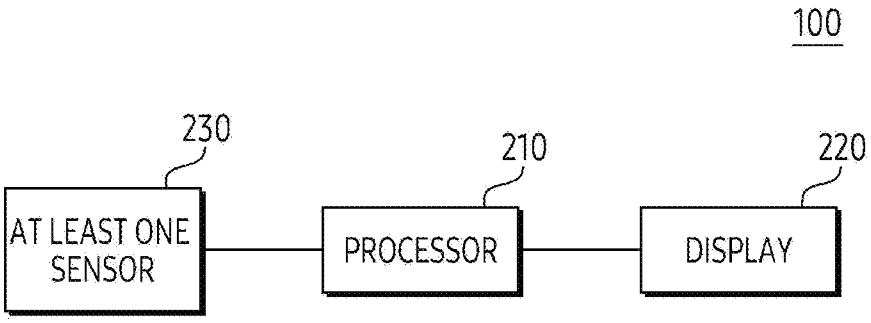
FIG. 2 is a simplified block diagram of an exemplary electronic device.

FIG. 2 is a simplified block diagram of an exemplary electronic device.

Referring to FIG. 2, the electronic device 100 may include a processor 210, a display 220, and at least one sensor 230. For example, the processor 210 may include at least a portion of the processor 2220 to be illustrated through FIG. 22. For example, the display 220 may include at least a portion of the display module 2260 to be illustrated through FIG. 22. For example, the at least one sensor 230 may include at least a portion of the sensor module 2276 to be illustrated through FIG. 22.

For example, the processor 210 may be operably coupled with each of the display 220 and the at least one sensor 230. For example, the processor 210 being operably coupled with each of the display 220 and the at least one sensor 230 may indicate that the processor 210 is directly connected to each of the display 220 and the at least one sensor 230. For example, the processor 210 being operably coupled with each of the display 220 and the at least one sensor 230 may indicate that the processor 210 is connected to each of the display 220 and the at least one sensor 230 through another component of the electronic device 100. For example, the processor 210 being operably coupled with each of the display 220 and the at least one sensor 230 may indicate that each of the display 220 and the at least one sensor 230 operates based on instructions executed by the processor 210. For example, the processor 210 being operably coupled with each of the display 220 and the at least one sensor 230 may indicate that each of the display 220 and the at least one sensor 230 is controlled by the processor 210. However, it is not limited thereto.

For example, the processor 210 may execute operations to display the user interface 120 for the context-specific setting. Some of the operations may be exemplified through FIG. 3.

The processor 210 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing variety of the recited/disclosed functions, e.g., in a distributed manner. At least one processor may execute program instructions to achieve or perform various functions.

Figure 3:
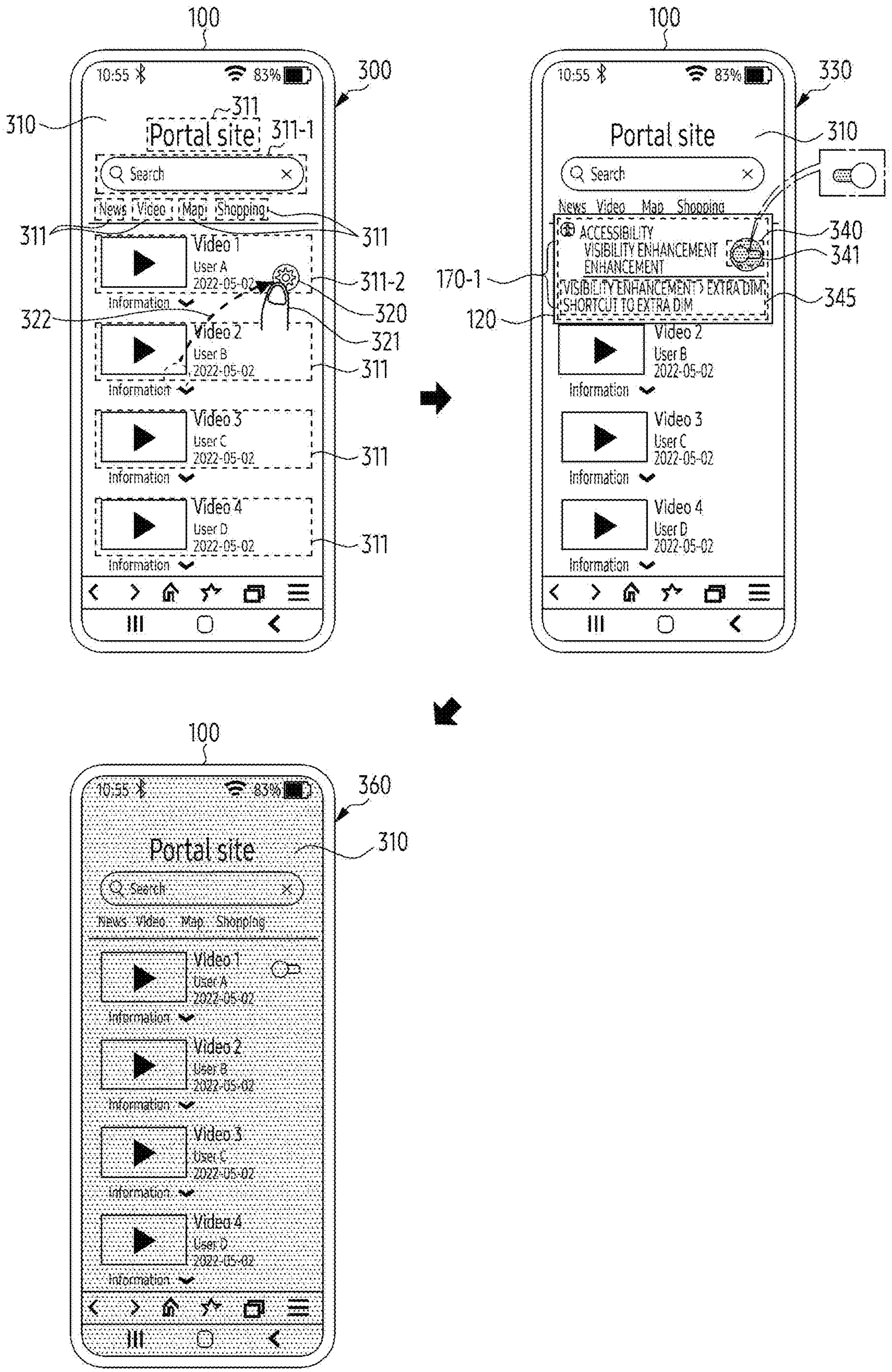
FIG. 3 illustrates an exemplary method for displaying a user interface for context-specific setting.

FIG. 3 illustrates an exemplary method for displaying a user interface for context-specific setting.

Referring to FIG. 3, the processor 210 may display an executable object 320 for displaying the user interface 120, as in a state 300. For example, the executable object 320 may be partially superimposed on a screen 310. For example, the executable object 320 may be floated on the screen 310. Although FIG. 3 illustrates an example in which the screen 310 is a user interface (e.g., Internet browser) of a software application, this is for convenience of explanation. For example, the screen 310 may include a lock screen, a screen displayed within a low power state of the electronic device 100 (e.g., a screen displayed within an always on display (AOD) mode), or a quick panel.

For example, the processor 210 may receive an input 321 on the executable object 320. For example, the input 321 may be a touch input having a contact point on the executable object 320. For example, the input 321 may be a touch input of tapping the executable object 320. However, it is not limited thereto.

For example, in response to input 321, the processor 210 may identify a setting menu corresponding to a function provided through an object, within the screen 310, positioned under the executable object 320, or the screen 310, among setting menus (e.g., the setting menus 140) for the global setting.

For example, the screen 310 may be associated with one or more setting menus. For example, the executable object 320 being superimposed on the screen 310 may indicate a situation of adjusting a value of a portion of settings provided through the one or more setting menus, so the processor 210 may identify a function provided through the screen 310.

For example, the screen 310 may include a plurality of objects 311. For example, a setting menu associated with a portion of the plurality of objects 311 may be different from a setting menu associated with another portion of the plurality of objects 311. For example, a first object 311-1 of the plurality of objects 311 may be associated with a setting menu associated with a virtual keyboard or a setting menu associated with a language. For example, a second object 311-2 of the plurality of objects 311 may be associated with a setting menu associated with the display 220. For example, the executable object 320 being superimposed on the first object 311-1 may indicate a situation capable of adjusting a value of a portion of settings provided through the setting menu associated with the virtual keyboard or the setting menu associated with the language, and the executable object 320 being superimposed on the second object 311-2 may indicate a situation capable of adjusting a value of a portion of settings provided through the setting menu associated with the display 220, so the processor 210 may identify a function provided through the object positioned under the executable object 320 among the plurality of objects 311.

For example, the executable object 320 may be moved to identify a situation through an object positioned under the executable object 320. For example, the executable object 320 may be moved based on a drag input 322 on the executable object 320.

For example, the processor 210 may identify a setting menu corresponding to a function provided through the object, within the screen 310, positioned under the executable object 320 or the screen 310. For example, the processor 210 may identify the setting menu, based on identifying a service provided through a software application providing the screen 310, an execution state of the software application, an arrangement of the plurality of objects 311 within the screen 310 including the object under the executable object 320, and a function associated with the object.

For example, the processor 210 may identify a setting corresponding to data obtained through at least one sensor 230, among settings in the setting menu. For example, the data may indicate a state of the electronic device 100. For example, the data may indicate a posture of the electronic device 100 or movement of the electronic device 100. For example, the data may indicate a state around the electronic device 100. For example, the data may indicate an illuminance around the electronic device 100, a distance between the electronic device 100 and an external object, and whether the electronic device 100 is gripped. For example, the data may indicate a state of a user of the electronic device 100. For example, the data may indicate a heart rate of the user or a body temperature of the user. For example, since the data indicates the state of the electronic device 100, the state around the electronic device 100, and/or the state of the user, the data may indicate a situation associated with setting. The situation indicated by the data may be exemplified through FIG. 4.

Figure 4:
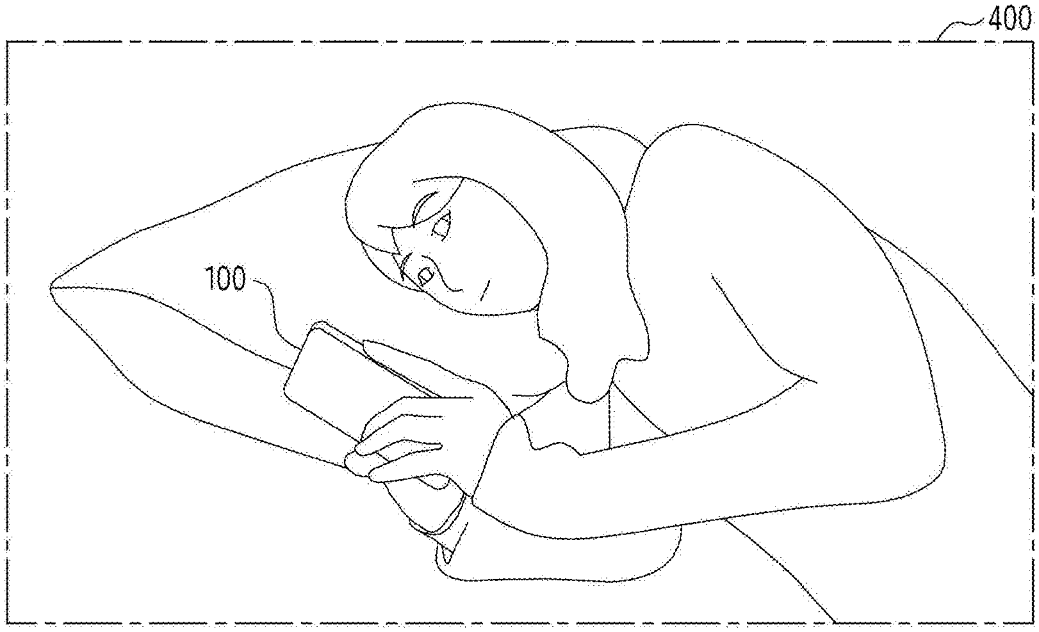
FIG. 4 illustrates an exemplary situation indicated by data.
Figure 4:
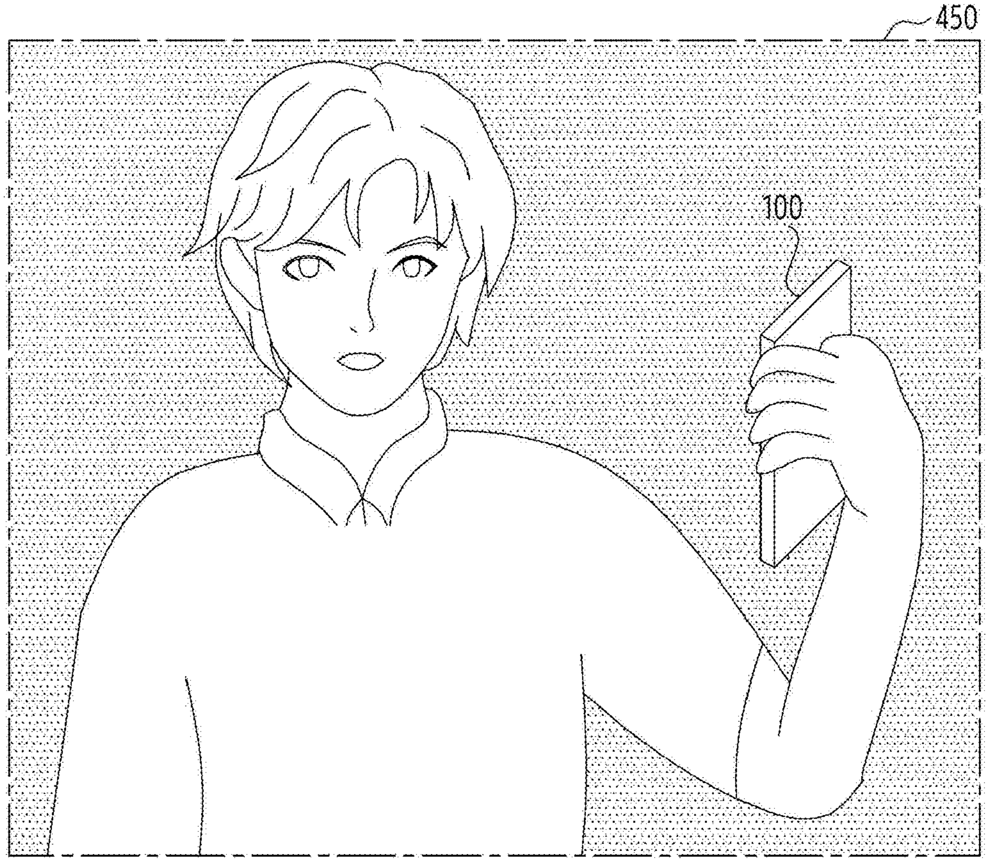

FIG. 4 illustrates an exemplary situation indicated by data.

Referring to FIG. 4, the data indicating a posture of the electronic device 100 and whether the electronic device 100 is gripped may indicate a situation 400 in which a lying user looks at the electronic device 100. For example, the situation 400 may be a situation capable of using a setting for releasing maintaining a portrait mode within the setting menu associated with the display 220.

For example, the data may indicate a situation 450 in which the illuminance around the electronic device 100 is relatively low. For example, the situation 450 may be a situation capable of using a setting for adjusting a brightness of the display 220 within the setting menu associated with the display 220.

Referring back to FIG. 3, the processor 210 may change the state 300 to a state 330 in response to identifying the setting. In the state 330, the processor 210 may display the user interface 120. For example, the user interface 120 may be at least partially superimposed or floated on the screen 310. For example, the user interface 120 may include an item 340 for adjusting a value of the identified setting. For example, since receiving the input 321 on the executable object 320 superimposed on the second object 311-2 while the illuminance around the electronic device 100 is relatively low indicates a situation capable of using a setting for adjusting a brightness of the display 220 in the setting menu associated with the display 220, the processor 210 may display, in the state 330, the user interface 120 including the item 340 capable of adjusting a brightness value of the display 220.

For example, in the state 330, the user interface 120 may further include another item 345. For example, the other item 345 may be used to display another user interface 130 including the item 340. For example, the other user interface 130, which is displayed according to an input on the other item 345, may include the item 340 and at least one item for adjusting a value of at least one other setting associated with the identified setting. However, it is not limited thereto.

For example, the processor 210 may receive, in the state 330, an input 341 on the item 340. For example, the input 341 may change a state of the item 340. For example, the input 341 may be an input indicating to adjust the brightness value of the display 220 to a value lower than a minimum value of a reference brightness range. However, it is not limited thereto.

For example, the processor 210 may change the state 330 to a state 360 in response to the input 341. For example, the processor 210 may adjust the value from a first value to a second value, in response to the input 341 on the item 340. For example, the processor 210 may display, in the state 360, the screen 310 based on the second value. For example, when the value is the brightness value of the display 220, the processor 210 may display, in the state 360, the screen 310 with a reduced brightness.

For example, in the state 360, the processor 210 may cease displaying the user interface 120. However, it is not limited thereto.

As described above, the electronic device 100 may enhance, via the user interface 120 for adjusting a value of a setting suitable for a situation, user experience for adjusting the value of the setting. For example, the electronic device 100 may simplify a plurality of user inputs used to adjust the value of the setting suitable for the situation via the other user interface 130, by displaying the user interface 120. For example, since a size of a load consumed to process the user input for the user interface 120 may be smaller than a size of a load consumed to process the plurality of user inputs, the electronic device 100 may enhance efficiency of a resource for adjusting the value of the setting.

Referring back to FIG. 2, the processor 210 may display the executable object 320 in response to identifying an event. For example, the event may be exemplified through FIGS. 5 to 12.

FIGS. 5 to 12 illustrate an exemplary method for displaying an executable object for displaying a user interface for context-specific setting.

Figure 5:
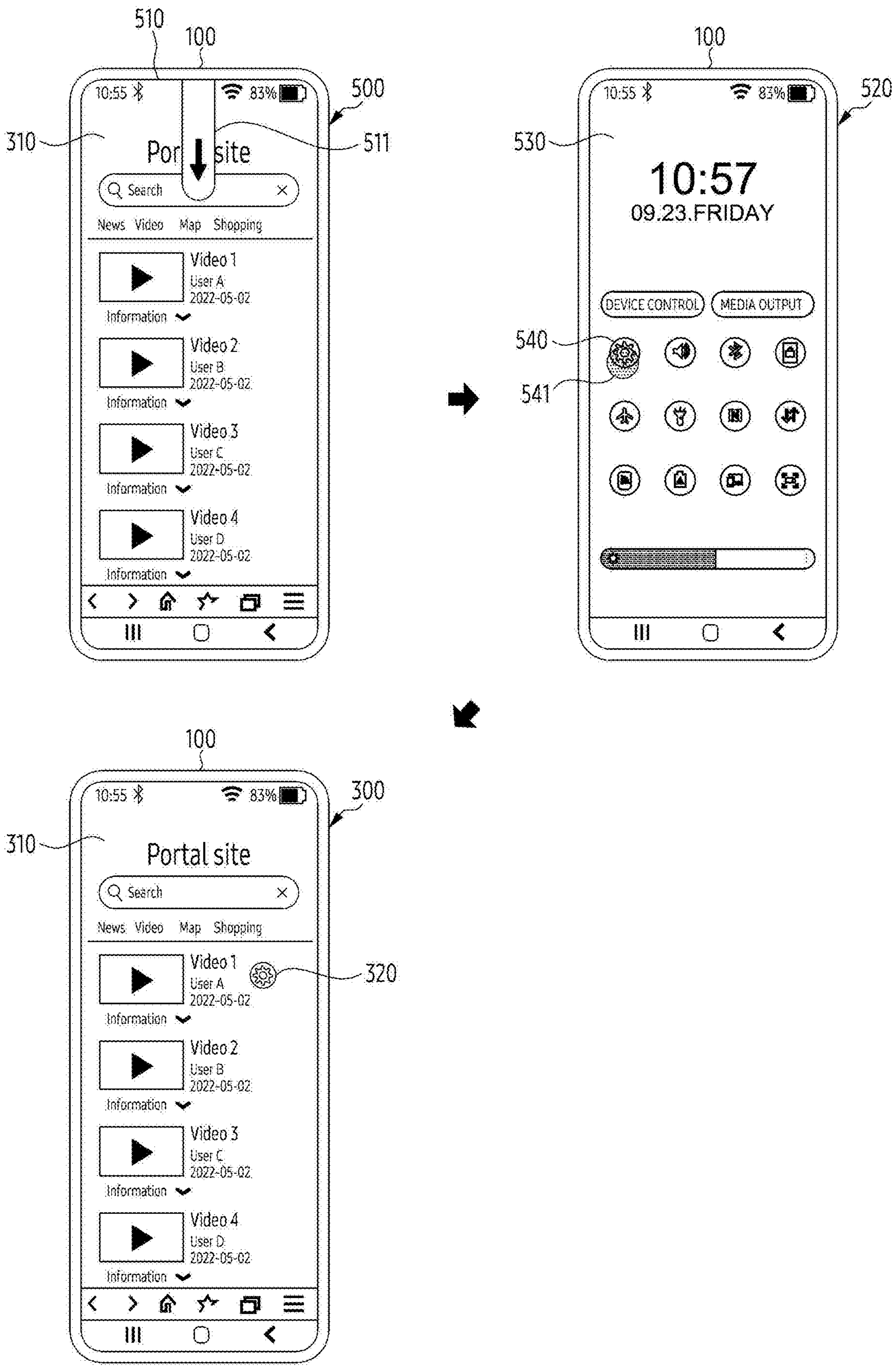
FIGS. 5 to 12 illustrate exemplary methods for displaying an executable object for displaying a user interface for context-specific setting.

Referring to FIG. 5, the processor 210 may receive a drag input 511 from a periphery 510 of the display 220, as in a state 500, while a screen 310 is displayed. The processor 210 may change the state 500 to a state 520, in response to the drag input 511.

In the state 520, the processor 210 may display a quick panel 530 superimposed on the screen 310. For example, the quick panel 530 may be translucent so that the screen 310 under the quick panel 530 appears blurred. However, it is not limited thereto. For example, the quick panel 530 may be opaque.

For example, the quick panel 530 may include an item 540. For example, the item 540 may be an item for displaying an executable object 320. For example, the processor 210 may receive an input 541 on the item 540. For example, the processor 210 may change the state 520 to a state 300, in response to the input 541.

For example, the processor 210 may display, in the state 300, an executable object 320 partially superimposed on the screen 310. For example, the executable object 320 may be superimposed on a focused object among the plurality of objects 311 (illustrated in FIG. 3) within the screen 310. For example, the executable object 320 may be superimposed on an object designated (or identified) based on a user input among the plurality of objects 311 (illustrated in FIG. 3) within the screen 310. For example, the user input may be received through a screen (or user interface) to provide a setting for the executable object 320. As a non-limiting example, a priority of the object designated (or identified) based on the user input may be higher than a priority of each of other objects illustrated through the descriptions below. Although not illustrated in FIG. 3, while at least a portion of the object designated (or identified) based on the user input and the other objects is displayed within the screen 310, the executable object 320 may be superimposed on the object having a priority higher than that of each of the other objects. However, it is not limited thereto. For example, the executable object 320 may be superimposed on an object associated with an external electronic device connected to the electronic device 100 among the plurality of objects 311 (illustrated in FIG. 3) within the screen 310. Although not illustrated in FIG. 3, when the screen 310 includes a quick panel, the executable object 320 may be superimposed on an object in the quick panel indicating a connection with the external electronic device. As a non-limiting example, the object in the quick panel may be further used to enable Wi-Fi communication or Bluetooth (e.g., legacy Bluetooth and/or Bluetooth low energy (BLE)). For example, the executable object 320 may be superimposed on an object of a specified type (e.g., mov, avi, mp4, mkv, mp3, ogg) such as video and/or music among the plurality of objects 311 (illustrated in FIG. 3) within the screen 310. For example, the executable object 320 may be superimposed on an object whose number of setting changes exceeds a specified number of times or an object whose setting changes have been performed most often, among the plurality of objects 311 (illustrated in FIG. 3) within the screen 310. For example, the executable object 320 may be superimposed on an object having a highest priority among the plurality of objects 311 within the screen 310. However, it is not limited thereto. For example, the executable object 320 may be partially superimposed on the screen 310 at a predetermined position.

Figure 6:
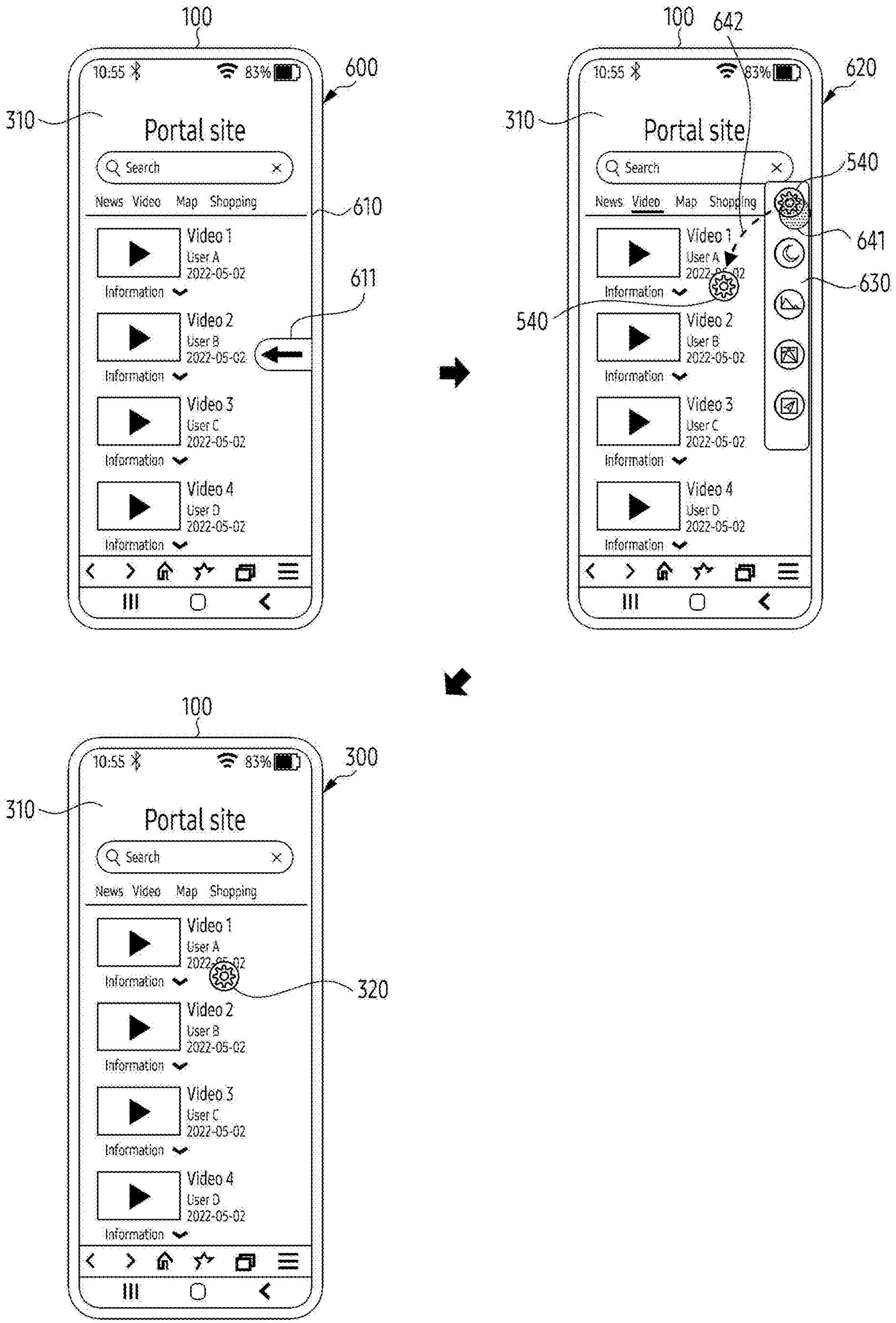

Referring to FIG. 6, the processor 210 may receive a drag input 611 from a periphery 610 of the display 220 while the screen 310 is displayed, as in a state 600. The processor 210 may change the state 600 to state a 620, in response to the drag input 611.

In the state 620, the processor 210 may display a panel 630 partially superimposed on the screen 310 and positioned along the periphery 610 of the display 220. For example, the panel 630 may be referred to as an edge panel in terms of being positioned along the periphery 610. The panel 630 may be translucent such that a portion of the screen 310 under the panel 630 appears blurred. However, it is not limited thereto. For example, the panel 630 may be opaque.

For example, the panel 630 may include an item 540. For example, the processor 210 may receive an input 641 or an input 642 on the item 540. For example, the input 641 may be a touch input of tapping the item 540. For example, the input 642 may be a drag input on the item 540. For example, the processor 210 may change the state 620 to the state 300, in response to the input 641 or the input 642.

For example, the processor 210 may display an executable object 320 partially superimposed on the screen 310 in the state 300. For example, the executable object 320 displayed in response to the input 641 may be superimposed on a focused object among the plurality of objects 311 (illustrated in FIG. 3) within the screen 310. For example, the executable object 320 may be superimposed on an object having the highest priority among the plurality of objects 311 within the screen 310. For example, the executable object 320 displayed in response to the input 642 may be displayed at a position where the input 642 is released. However, it is not limited thereto. For example, the executable object 320 may be partially superimposed on the screen 310 at a predetermined position.

Figure 7:
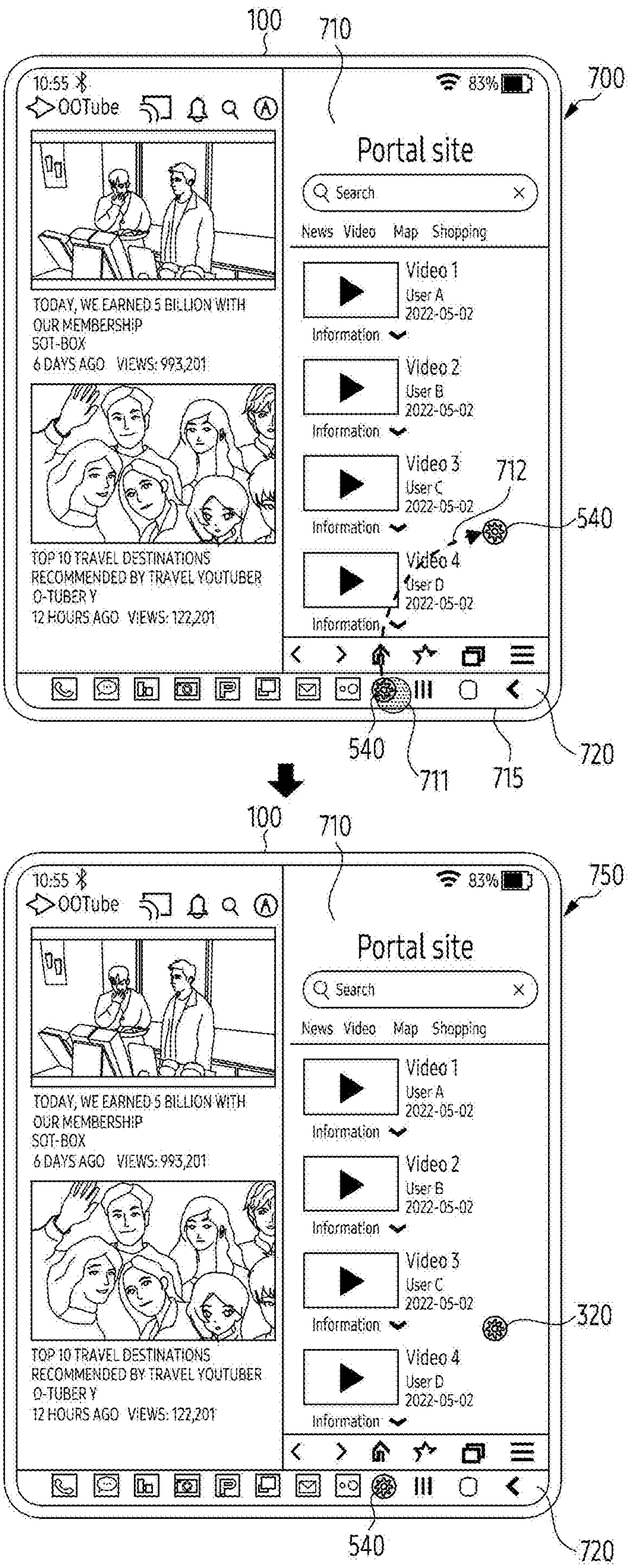

Referring to FIG. 7, the processor 210 may display a bar-shaped panel 720 positioned along a periphery 715 of the display 220 together with a screen 710, as in a state 700. For example, the bar-shaped panel 720 may be referred to as a task bar.

For example, the panel 720 may include an item 540. For example, the processor 210 may receive an input 711 or an input 712 on the item 540. For example, the input 711 may be a touch input of tapping the item 540. For example, the input 712 may be a drag input on the item 540. For example, the processor 210 may change the state 700 to a state 750, in response to the input 711 or the input 712.

For example, the processor 210 may display an executable object 320 partially superimposed on the screen 710 in the state 750. For example, the executable object 320 displayed in response to the input 711 may be superimposed on a focused object among a plurality of objects in the screen 710. For example, the executable object 320 may be superimposed on an object having the highest priority among the plurality of objects within the screen 710. For example, the executable object 320 displayed in response to the input 742 may be displayed at a position where the input 712 is released. However, it is not limited thereto. For example, the executable object 320 may be partially superimposed on the screen 310 at a predetermined position.

Figure 8:
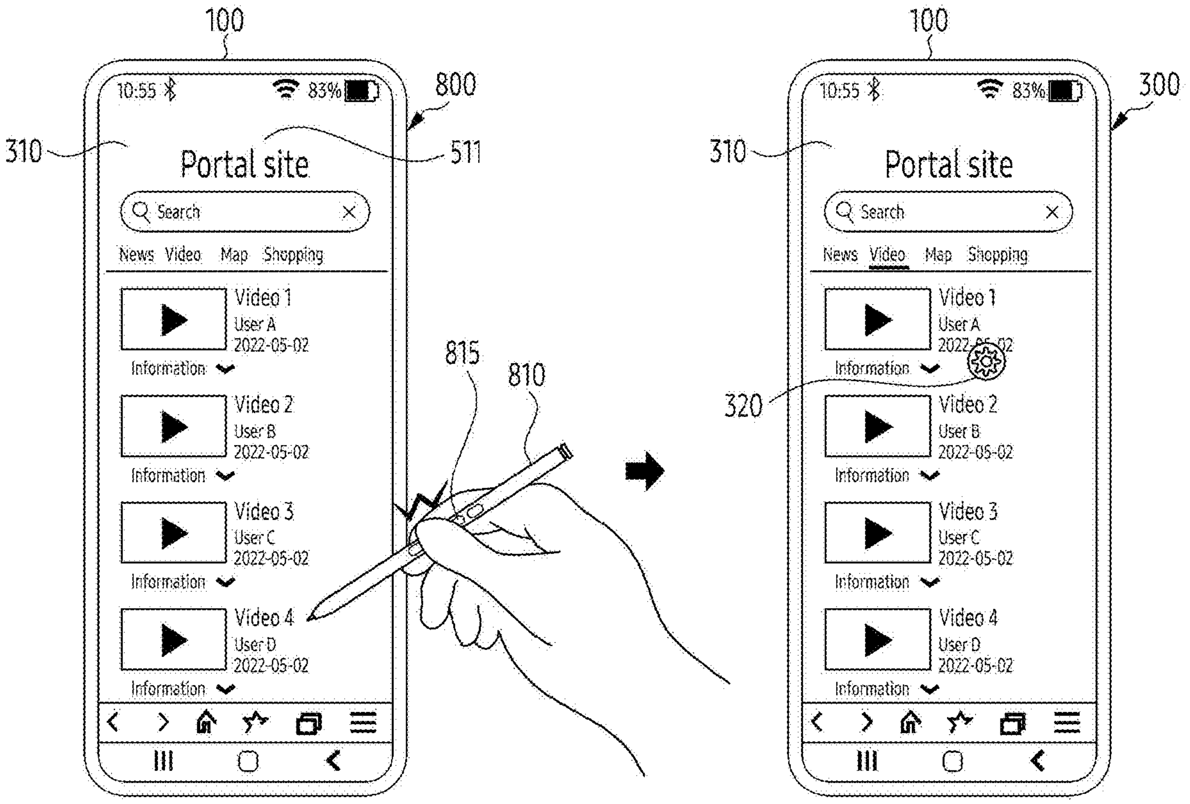

Referring to FIG. 8, the processor 210 may identify changing of a state of a stylus pen 810 capable of causing a touch input via the display 220, while a screen 310 is displayed, as in a state 800. For example, the changing of the state of the stylus pen 810 may include changing a state of the stylus pen 810 to a grip state. For example, the changing of the state of the stylus pen 810 may include that a button 815 exposed through a portion of a housing of the stylus pen 810 is depressed. For example, when the stylus pen 810 is a stylus pen at least partially stored in the electronic device 100 or a stylus pen contacting a housing of the electronic device 100, the changing of the state of the stylus pen 810 may include that at least a portion of the stylus pen 810 stored in the electronic device 100 is exposed and that the stylus pen 810 contacting the housing of the electronic device 100 is spaced apart from the housing. However, it is not limited thereto.

For example, the processor 210 may change the state 800 to the state 300 in response to the identification. For example, the processor 210 may display an executable object 320 partially superimposed on the screen 310 within the state 300. For example, an executable object 320 displayed in response to the identification may be superimposed on a focused object among the plurality of objects 311 (illustrated in FIG. 3) within the screen 310. For example, the executable object 320 may be superimposed on an object having the highest priority among the plurality of objects 311 within the screen 310. For example, the executable object 320 displayed in response to the identification may be displayed at a position over the screen 310 where the stylus pen 810 is hovered. However, it is not limited thereto. For example, the executable object 320 may be partially superimposed on the screen 310 at a predetermined position.

Figure 9:
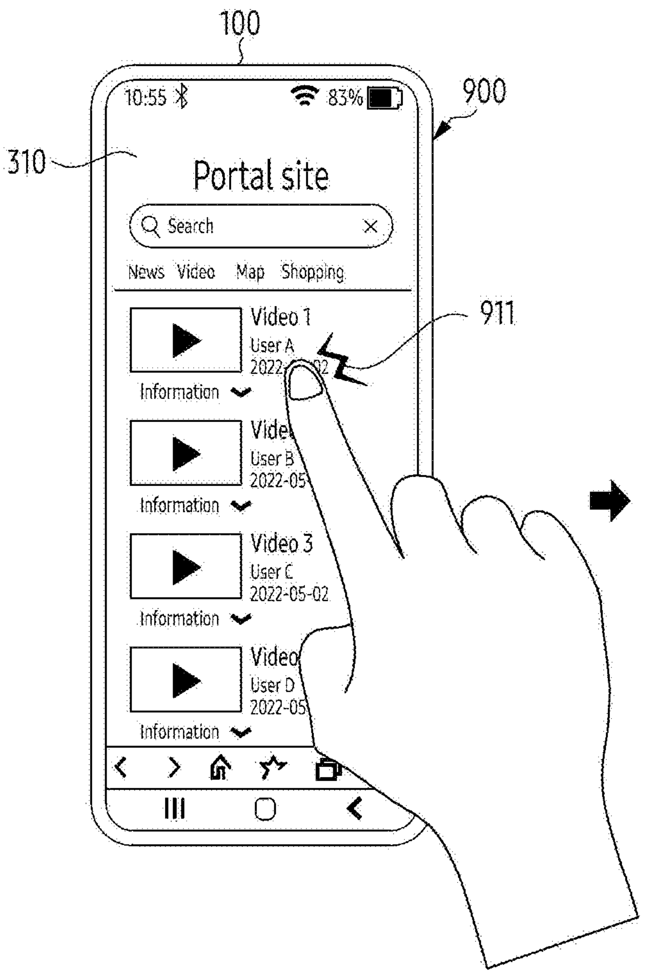

Referring to FIG. 9, the processor 210 may receive a touch input 911 on the screen 310, having an intensity greater than a reference intensity while the screen 310 is displayed, as in a state 900. For example, the intensity of the touch input 911 may be greater than an intensity of a touch input of tapping one object among the plurality of objects 311 (illustrated in FIG. 3) within the screen 310. For example, the intensity of the touch input of tapping the object may be less than or equal to the reference intensity, and the intensity of the touch input 911 may be greater than the reference intensity. For example, the processor 210 may change the state 900 to the state 300 in response to the touch input 911.

For example, the processor 210 may display an executable object 320 partially superimposed on the screen 310 within the state 300. For example, the executable object 320 displayed in response to the touch input 911 may be superimposed on a focused object among the plurality of objects 311 (illustrated in FIG. 3) within the screen 310. For example, the executable object 320 may be superimposed on an object having the highest priority among the plurality of objects 311 within the screen 310. For example, the executable object 320 displayed in response to the touch input 911 may be displayed at a position where the touch input 911 is released. However, it is not limited thereto. For example, the executable object 320 may be partially superimposed on the screen 310 at a predetermined position.

Figure 10:
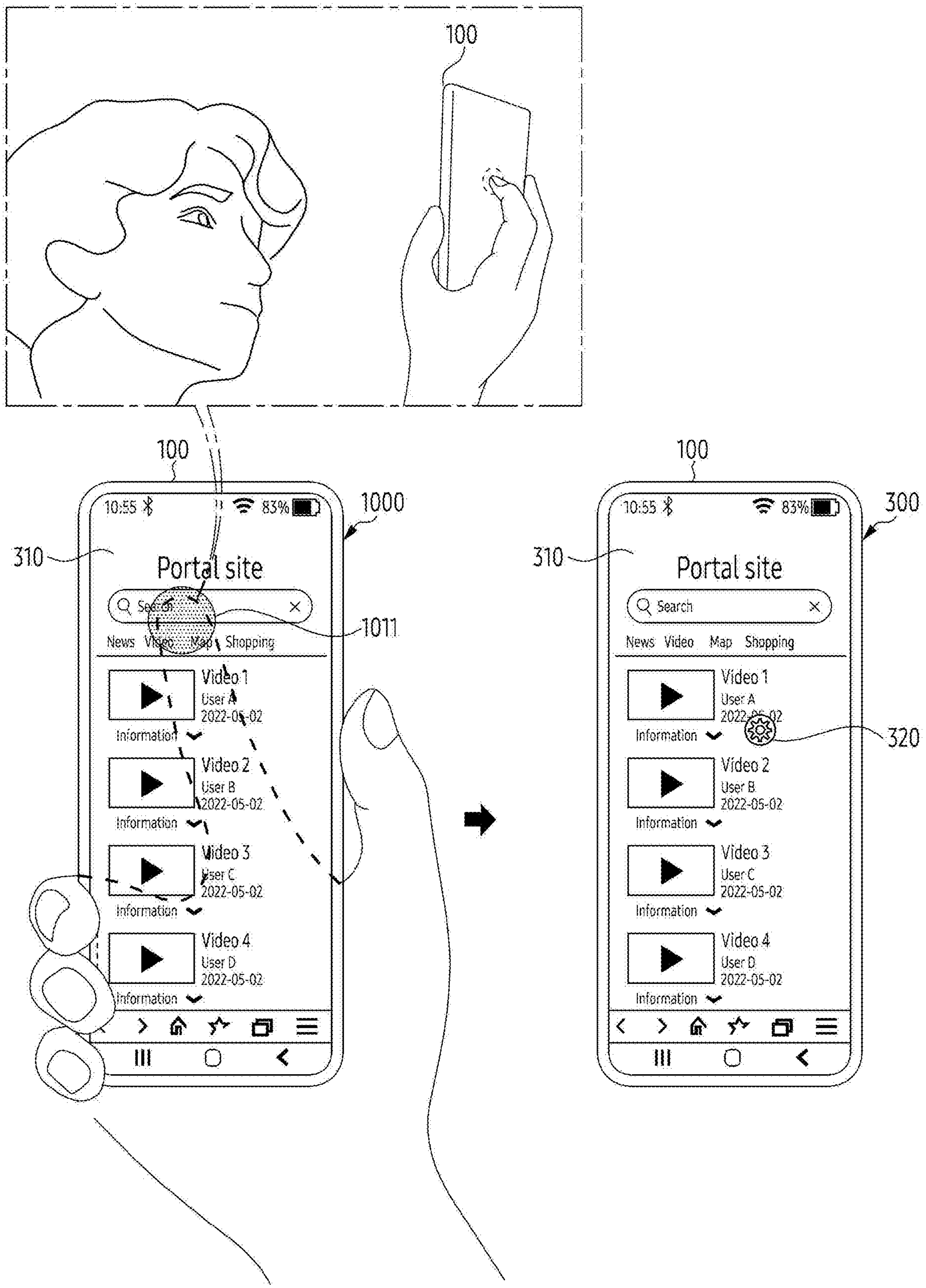

Referring to FIG. 10, the processor 210 may receive a multiple tapping input 1011, via a side of a housing of the electronic device 100, facing a second direction opposite to a first direction toward which the display 220 faces while the screen 310 is displayed, as in a state 1000. For example, the multiple tapping input 1011 may be an input of tapping the side twice or three times. However, it is not limited thereto. For example, the processor 210 may change the state 1000 to the state 300 in response to the multiple tapping input 1011.

For example, the processor 210 may display an executable object 320 partially superimposed on the screen 310 within the state 300. For example, the executable object 320 displayed in response to the multiple tapping input 1011 may be superimposed on a focused object among the plurality of objects 311 (illustrated in FIG. 3) within the screen 310. For example, the executable object 320 may be superimposed on an object having the highest priority among the plurality of objects 311 within the screen 310. However, it is not limited thereto. For example, the executable object 320 may be partially superimposed on the screen 310 at a predetermined position.

Figure 11:
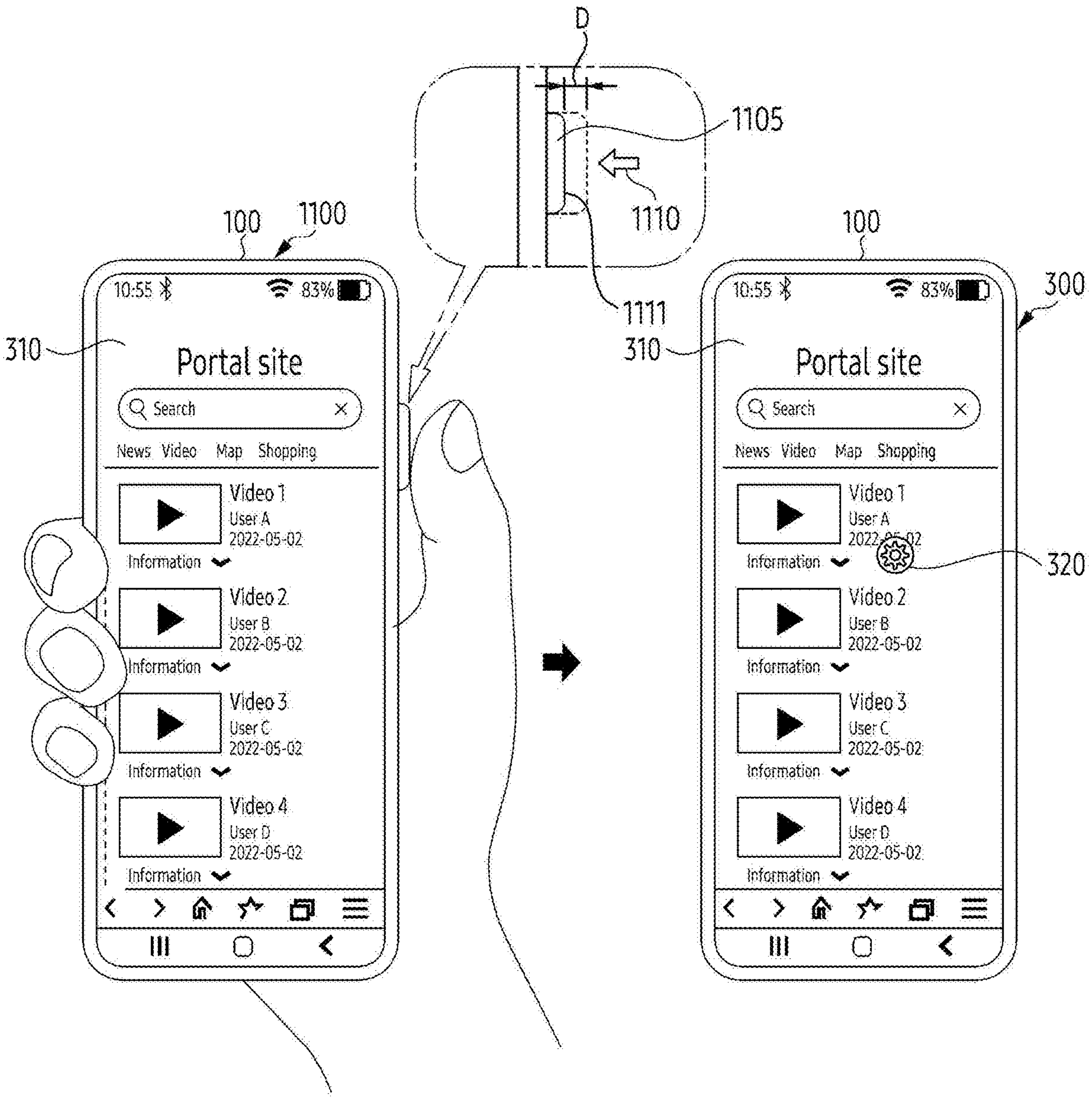

Referring to FIG. 11, the processor 210 may receive an input 1110 in which an end 1111 of a physical button 1105 exposed via a portion of a housing of the electronic device 100 moves a certain distance while the screen 310 is displayed, as in a state 1100. For example, the input 1110 may be an input of depressing the physical button 1105 so that an end 1111 of the physical button 1105 moves a distance D. For example, the distance D may be between a first reference distance and a second reference distance. For example, the first reference distance may be a reference distance defined to identify that the physical button 1105 is depressed, and the second reference distance may be a reference distance defined for the input 1110. However, it is not limited thereto. For example, the input 1110 may be defined, such as input received with respect to a camera for locking a focus or exposure. However, it is not limited thereto. For example, the input 1110 may be an input that repeats depressing and releasing of the physical button 1105 N times (N is a natural number of 1 or more), or an input that depresses the physical button 1105 for a predetermined time (e.g., for n seconds, n is a real number greater than 0). However, it is not limited thereto.

For example, the processor 210 may change the state 1100 to the state 300 in response to the input 1110. For example, the processor 210 may display an executable object 320 partially superimposed on the screen 310 within the state 300. For example, the executable object 320 displayed in response to the input 1110 may be superimposed on a focused object among the plurality of objects 311 (illustrated in FIG. 3) within the screen 310. For example, the executable object 320 may be superimposed on an object having the highest priority among the plurality of objects 311 within the screen 310. However, it is not limited thereto. For example, the executable object 320 may be partially superimposed on the screen 310 at a predetermined position.

Figure 12:
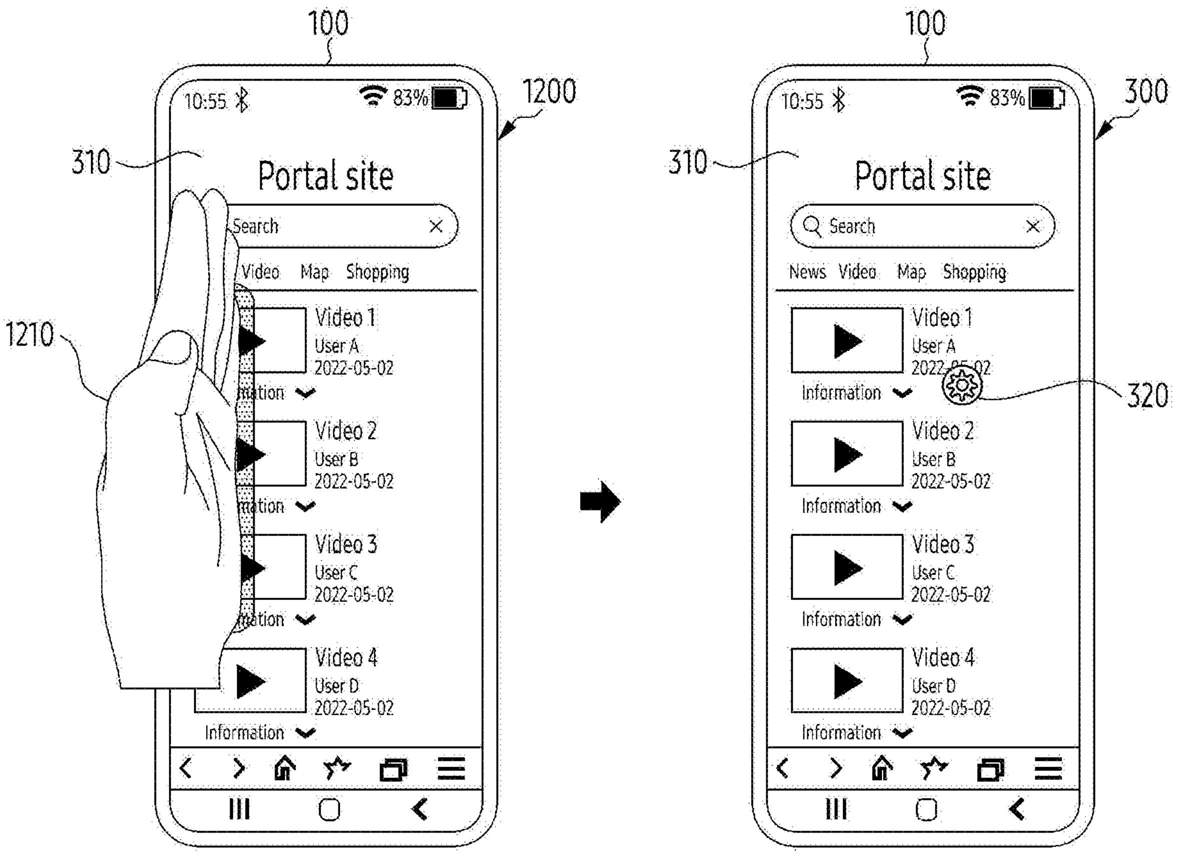

Referring to FIG. 12, the processor 210 may receive a touch input 1210 having contact area wider than reference area while the screen 310 is displayed, as in a state 1200. For example, the touch input 1210 may be referred to as a palm touch input. For example, the touch input 1210 may have contact area larger than contact area of a touch input tapping one of the plurality of objects (illustrated in FIG. 3) within the screen 310. For example, the contact area of the touch input tapping the object may be smaller than the reference area, and the contact area of the touch input 1210 may be larger than the reference area. For example, the processor 210 may change the state 1200 to the state 300 in response to the touch input 1210.

For example, the processor 210 may display an executable object 320 partially superimposed on the screen 310 within the state 300. For example, the executable object 320 displayed in response to the touch input 1210 may be superimposed on a focused object among the plurality of objects 311 (illustrated in FIG. 3) within the screen 310. For example, the executable object 320 may be superimposed on an object having the highest priority among the plurality of objects 311 within the screen 310. For example, the executable object 320 displayed in response to the touch input 1210 may be displayed at a position where the touch input 1210 is released. For example, the position may be a representative point indicating a position of contact area of the touch input 1210. However, it is not limited thereto. For example, the executable object 320 may be partially superimposed on the screen 310 at a predetermined position.

Referring back to FIG. 2, the processor 210 may identify whether a situation associated with the adjustment to the second value is released based on adjusting the value to the second value in response to the input 341 on the item 340 within the user interface 120. For example, the identification may be executed to restore the second value to the first value. The identification and the restoration in accordance with the identification may be exemplified through FIG. 13.

Figure 13:
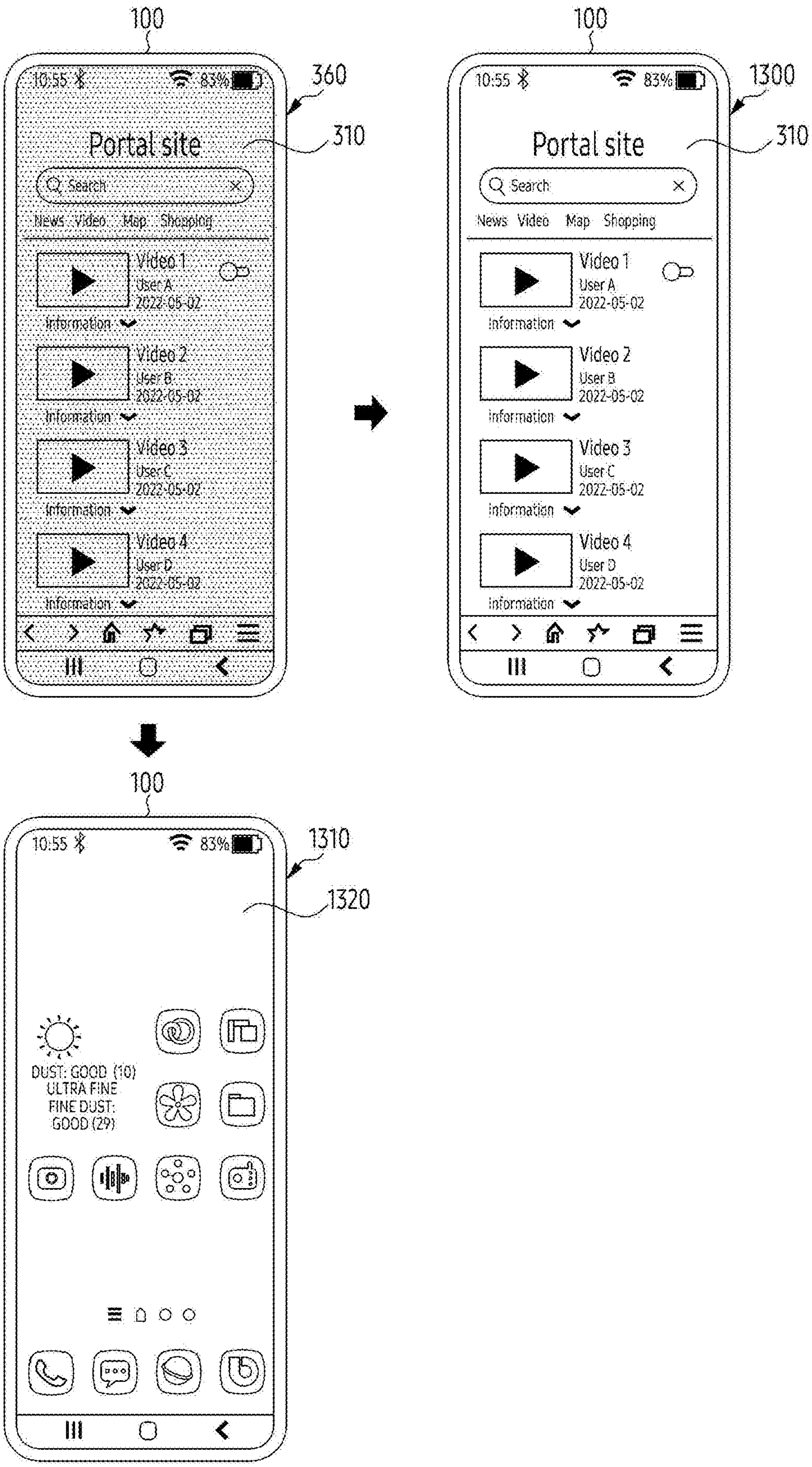
FIG. 13 illustrates an exemplary method for restoring a screen controlled via a user interface for context-specific setting.

FIG. 13 illustrates an exemplary method for restoring a screen controlled via a user interface for context-specific setting.

Referring to FIG. 13, the processor 210 may provide a state 360, based on adjusting the value to the second value in response to the input 341. In the state 360, the processor 210 may identify whether a situation associated with the adjustment to the second value is released. For example, the processor 210 may identify whether the displaying of the screen 310 is ceased. For example, the processor 210 may identify whether the screen 310 is changed to another screen. For example, the processor 210 may identify whether at least a portion of objects included in the screen 310 is changed. For example, the processor 210 may identify whether the data received through at least one sensor 230 indicates another situation distinct from the situation. However, it is not limited thereto.

For example, the processor 210 may change the value from the second value to the first value, in response to identifying that the situation is released.

For example, the processor 210 may change the state 360 to a state 1300, based on identifying, through the at least one sensor 230, that illuminance around the electronic device 100 increases. For example, in the state 1300, the processor 210 may adjust the brightness value of the display 220 into the reference brightness range.

For example, the processor 210 may change the state 360 to the state 1310 based on identifying that displaying of the screen 310 is ceased. For example, in the state 1310, the processor 210 may display a screen 1320 changed from the screen 310 at a brightness within the reference brightness range.

Referring back to FIG. 2, in order to provide an enhanced user experience for changing a value of setting, the electronic device 100 may change displaying of the other user interfaces 130 or an arrangement of setting menus (e.g., the setting menus 140) within the other user interfaces 130.

For example, the processor 210 may display, within the other user interface 130, at least one item for displaying a portion of settings that was provided via the user interface 120, together with a portion of the setting menus (e.g., the portion 150 of the setting menus 140). For example, the portion of the settings may be identified based on past usage history of the user interface 120.

For example, the processor 210 may identify whether a setting provided via the user interface 120 is used when the user interface 120 is displayed. For example, the processor 210 may update the number of uses of the setting, in response to identifying that the setting provided via the user interface 120 is used. For example, the processor 210 may store information on the setting having the number of uses greater than or equal to a reference number through this update. For example, the processor 210 may display, within the other user interface 130, the at least one item for displaying the portion of the settings that was provided through the user interface 120 and has the number of uses greater than or equal to the reference number. The at least one item within the other user interface 130 may be exemplified through FIG. 14.

Figure 14:
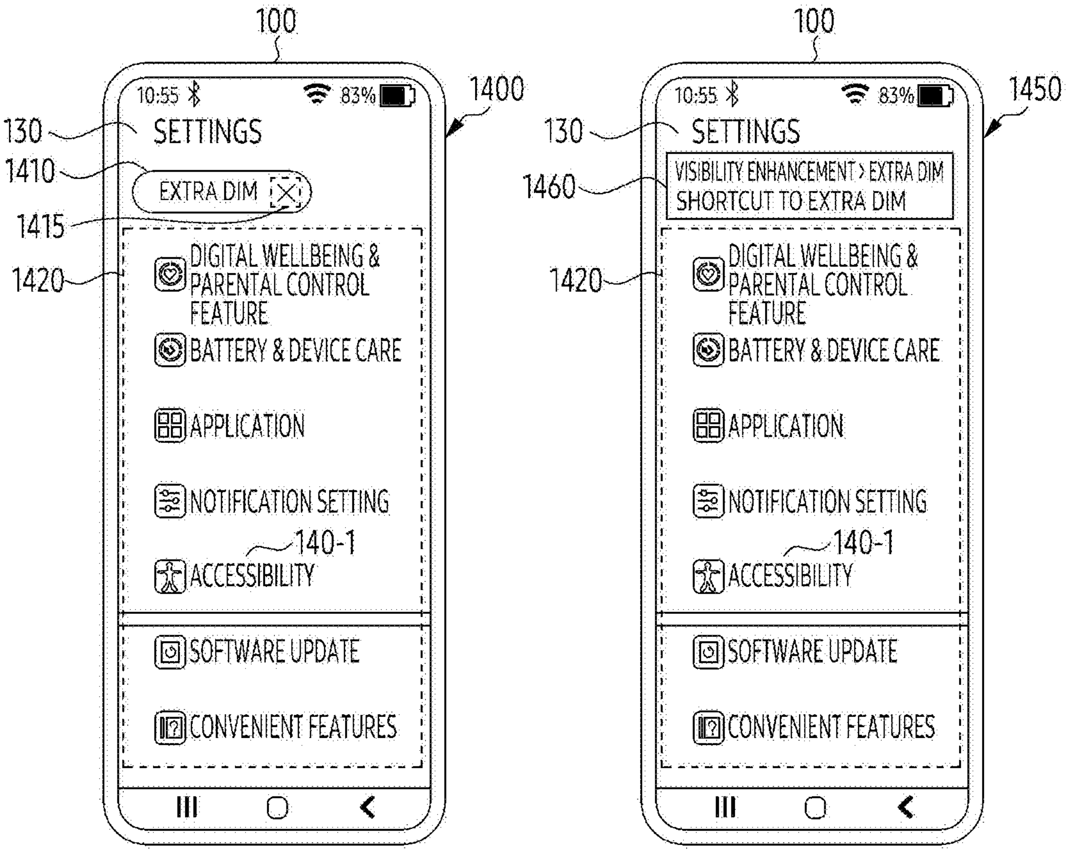
FIG. 14 illustrates an example of at least one item within a user interface for global setting.

FIG. 14 illustrates an example of at least one item within a user interface for global setting.

Referring to FIG. 14, the processor 210 may display at least one item 1410 for displaying, within another user interface 130, the portion of the settings provided through the user interface 120, as in a state 1400. For example, the at least one item 1410 may be displayed together with setting menus 1420 (e.g., the portion 150 of the setting menus 140) that are displayed in response to displaying the other user interface 130. For example, the at least one item 1410 may be displayed above the setting menus 1420. For example, the at least one item 1410 may be displayed above the setting menus 1420 to provide higher accessibility than each of the setting menus 1420. For example, the at least one item 1410 may include an executable element 1415 for excluding or removing the at least one item 1410 from the other user interface 130. For example, the processor 210 may exclude the at least one item 1410 from the other user interface 130, in response to a touch input having a contact point on the executable element 1415. For example, in response to a touch input having a contact point on a region of the at least one item 1410 different from a region of the executable element 1415, the processor 210 may change a state of the other user interface 130 from a state (e.g., the state 1400) of displaying the setting menus 1420 and the at least one item 1410 to a state for adjusting a value of a setting corresponding to the at least one item 1410. For example, the changed state may correspond to a state of the other user interface 130 provided through the other item 345 of FIG. 3. However, it is not limited thereto.

For example, the processor 210 may display at least one item 1460 for displaying, within the other user interface 130, the portion of the settings that was provided via the user interface 120, as in a state 1450. For example, the at least one item 1460 may be displayed, together with the setting menus 1420 (e.g., the portion 150 of the setting menus 140) displayed in response to displaying the other user interface 130. For example, the at least one item 1460 may be displayed above the setting menus 1420. For example, the at least one item 1460 may be displayed above the setting menus 1420 to provide higher accessibility than each of the setting menus 1420. For example, the at least one item 1460 may be a shortcut element. For example, unlike the at least one item 1410 including the executable element 1415, the at least one item 1460 may not include an executable element for excluding or removing the at least one item 1460 from the other user interface 130 in response to a single tab input. However, it is not limited thereto. For example, the at least one item 1460 may be changed from the at least one item 1410, based on identifying that the number of uses of the at least one item 1410 is greater than or equal to a reference number. However, it is not limited thereto.

For example, in response to a touch input on the at least one item 1460, the processor 210 may change a state of the other user interface 130 from a state (e.g., the state 1450) displaying the setting menus 1420 and the at least one item 1460 to a state for adjusting a value of a setting corresponding to the at least one item 1410. For example, the changed state may correspond to a state of the other user interface 130 provided via the other item 345 of FIG. 3. However, it is not limited thereto.

FIG. 14 illustrates an example of displaying the at least one item (e.g., the at least one item 1410 and/or the at least one item 1460) within the other user interface 130, but this is for convenience of explanation. For example, the at least one item may also be displayed within another screen. For example, the processor 210 may display the at least one item as a quick tile within a quick panel (e.g., the quick panel 530). For example, the processor 210 may display the at least one item as an icon or widget within a home screen. However, it is not limited thereto.

Referring back to FIG. 2, the processor 210 may adaptively display the other user interface 130 according to a state of the electronic device 100. For example, the state of the electronic device 100 may include a state in which a first subscriber identity module (SIM) is enabled and a state in which a second SIM is enabled. For example, the processor 210 may display the other user interface 130 in a first state based on the enabling of the first SIM, and may display the other user interface 130 in a second state based on the enabling of the second SIM. Adaptive displaying of a state of the other user interface 130 may be exemplified through FIG. 15.

Figure 15:
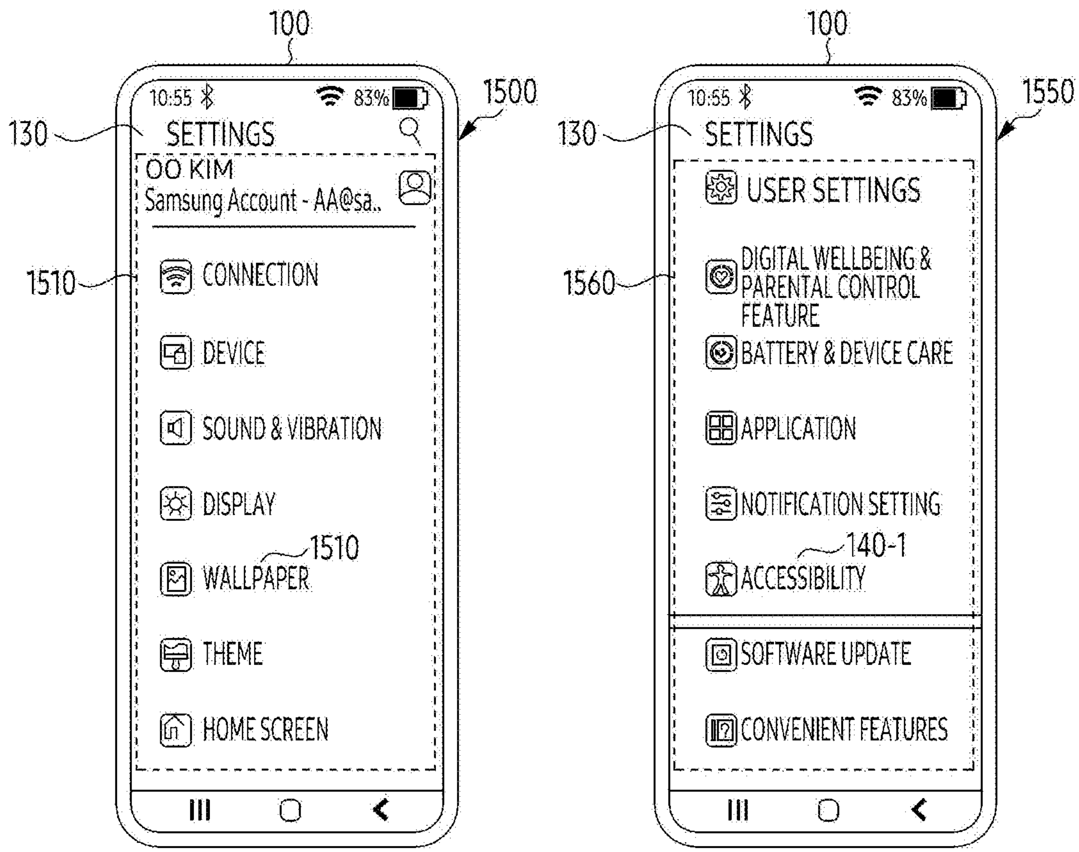
FIG. 15 illustrates an example of a user interface for a global setting displayed in an electronic device including a dual subscriber identity module (SIM).

FIG. 15 illustrates an example of a user interface for a global setting displayed in an electronic device including a dual subscriber identity module (SIM).

Referring to FIG. 15, the processor 210 may display another user interface 130 including setting menus 1510, as in a state 1500, based on the first SIM enabled within the electronic device 100. For example, the processor 210 may display another user interface 130 including setting menus 1560, as in a state 1550, based on the second SIM enabled within the electronic device 100. For example, when settings used while the first SIM was enabled are at least partially different from settings used while the second SIM was enabled, the setting menus 1510 may be at least partially different from the setting menus 1560. For example, a portion of the setting menus 1510 may not be included in the setting menus 1560. For example, a display order of the setting menus 1510 may be at least partially different from a display order of the setting menus 1560.

Referring back to FIG. 2, the processor 210 may provide a user interface for changing displaying of the other user interface 130 to enhance usability of the other user interface 130. The user interface may be exemplified through FIG. 16.

Figure 16:
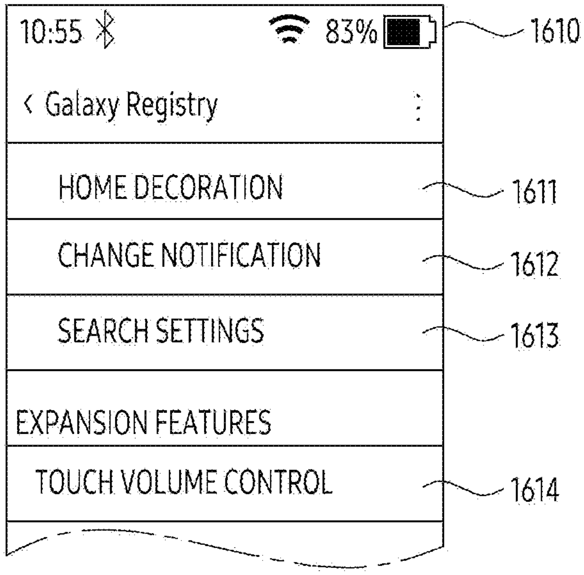
FIG. 16 illustrates an example of a user interface for changing a method of providing a global setting.

FIG. 16 illustrates an example of a user interface for changing a method of providing a global setting.

Referring to FIG. 16, the processor 210 may display a user interface 1610 for changing displaying of the other user interface 130 or for changing a method of providing the global setting.

For example, the user interface 1610 may include a first setting menu 1611, a second setting menu 1612, a third setting menu 1613, and/or a fourth setting menu 1614. For example, the first setting menu 1611 may be used to change displaying of the other user interface 130. For example, the second setting menu 1612 may be used to display a history in which values of settings (e.g., settings provided via the other user interfaces 130 (and/or the user interfaces 120)) have been adjusted. For example, the third setting menu 1613 may be used to change a method of searching for settings provided through the other user interface 130. For example, the fourth setting menu 1614 may be used to change a size of a sound signal outputted through a speaker of the electronic device 100 based on a touch input received through the display 220.

For example, in response to a touch input on the first setting menu 1611, the processor 210 may display at least one item for at least one setting provided via the first setting menu 1611 and/or at least one sub-setting menu of the first setting menu 1611. The at least one item and/or the at least one sub-setting menu may be exemplified through FIG. 17.

Figure 17:
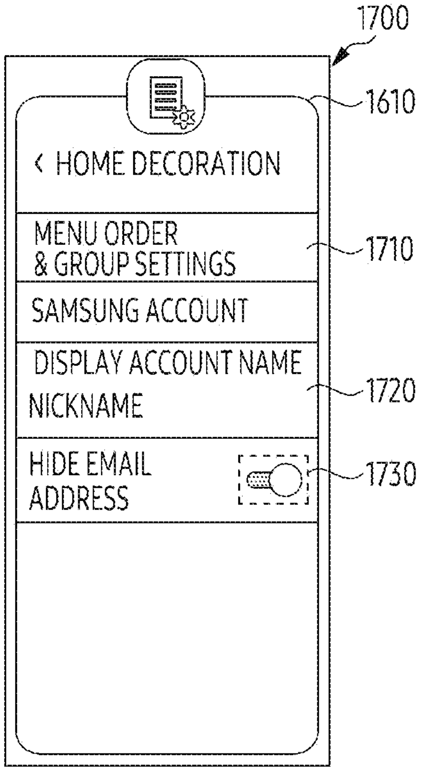
FIG. 17 illustrates an example of a setting menu of a user interface for changing a method of providing a global setting.

FIG. 17 illustrates an example of a setting menu of a user interface for changing a method of providing a global setting.

Referring to FIG. 17, in response to a touch input on the first setting menu 1611, the processor 210 may display, within the user interface 1610, a first sub-setting menu 1710 of the first setting menu 1611, a second sub-setting menu 1720 of the first setting menu 1611, and an item 1730 for a setting provided via the first setting menu 1611, as in a state 1700. For example, the first sub-setting menu 1710 may be used for a display order and/or grouping of setting menus displayed within the other user interface 130. For example, the second sub-setting menu 1720 may be used to adjust a display range of privacy information displayed within the other user interface 130. For example, the item 1730 may be used to set whether to display an email address within the privacy information. For example, when the item 1730 indicates enabling a feature corresponding to the item 1730 as illustrated in FIG. 17, the email address may not be displayed within the privacy information. For example, when the item 1730 indicates disabling the feature corresponding to the item 1730 as illustrated in FIG. 17, the email address may be displayed within the privacy information.

For example, the processor 210 may display a user interface 1610 including items each corresponding to settings provided via the first sub-setting menu 1710 in response to a touch input on the first sub-setting menu 1710, and a user interface 1610 including items each corresponding to settings provided via the second sub-setting menu 1720 in response to a touch input on the second sub-setting menu 1720. The user interface 1610 displayed in response to the touch input on the first sub-setting menu 1710 and the touch input on the second sub-setting menu 1720 may be exemplified through FIGS. 18 and 19.

Figure 18:
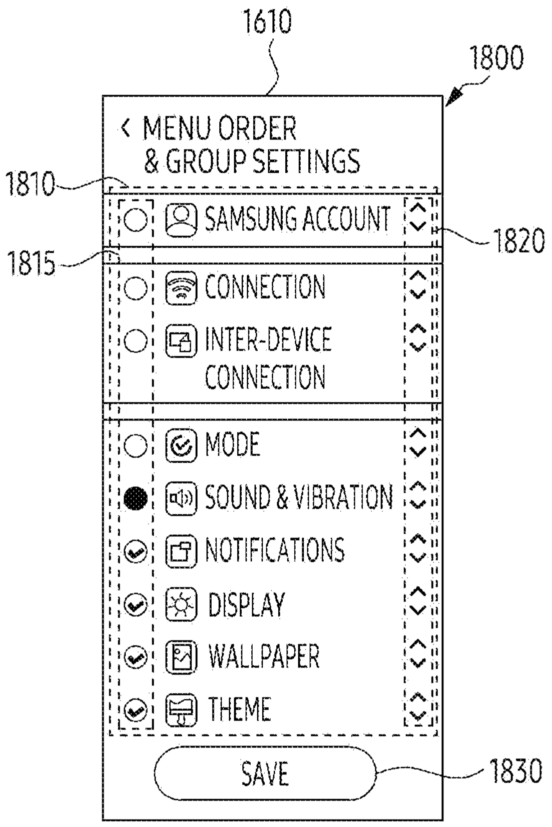
FIGS. 18 and 19 illustrate examples of functions provided through a setting menu of a user interface for changing a method of providing a global setting.
Figure 19:
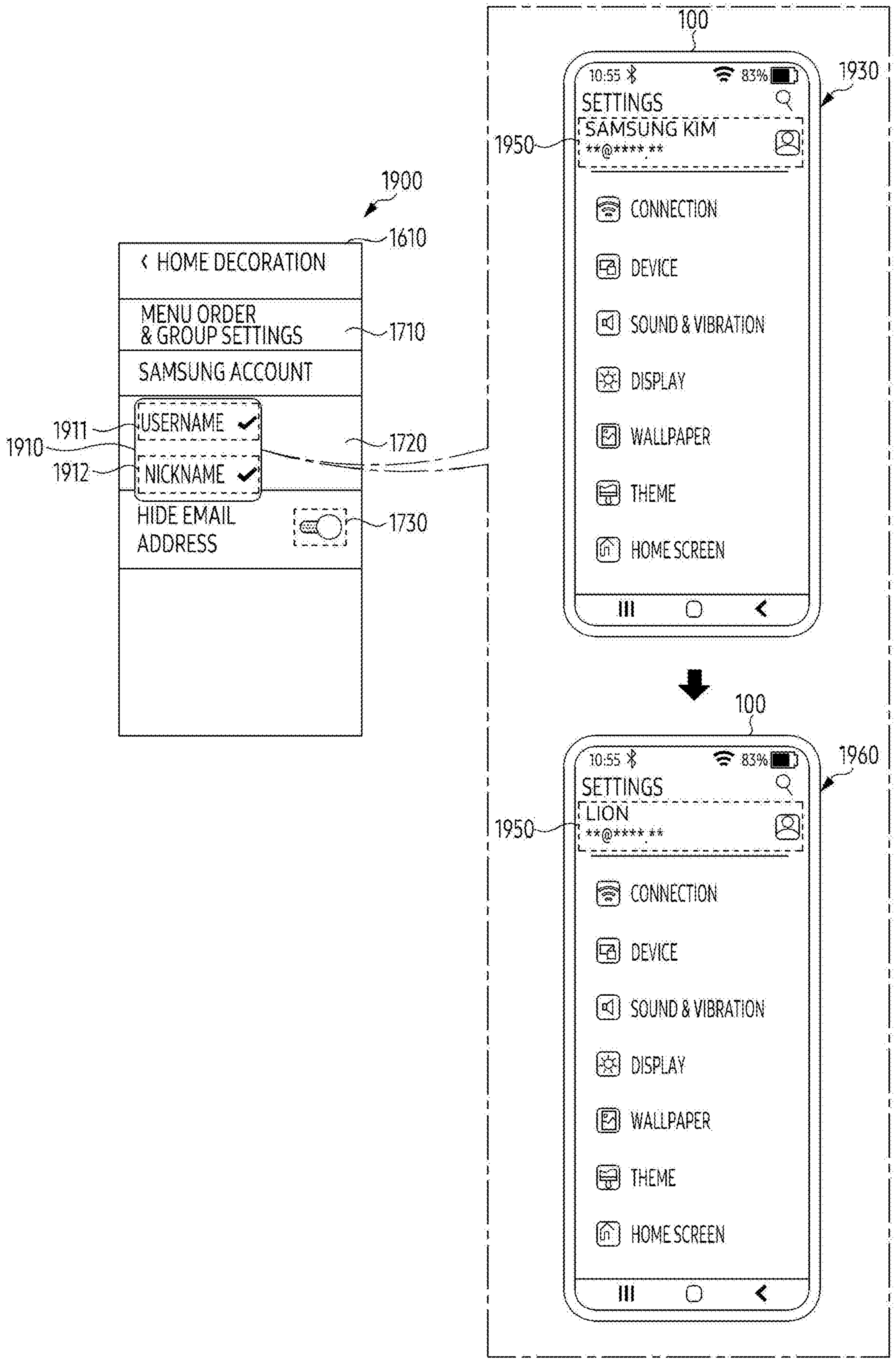

FIGS. 18 and 19 illustrate an example of functions provided through a setting menu of a user interface for changing a method of providing a global setting.

Referring to FIG. 18, in response to the touch input on the first sub-setting menu 1710, the processor 210 may display a user interface 1610 including items 1810 each corresponding to setting menus in the other user interface 130, as in a state 1800.

For example, each of the items 1810 may include an executable element for ceasing displaying of each of the setting menus within the other user interface 130, or removing each of the setting menus from the other user interface 130. For example, the items 1810 may include executable elements 1815, respectively. For example, at least a portion of the setting menus may be removed from the other user interface 130 via a touch input on at least a portion of the executable elements 1815.

For example, the items 1810 may each include executable elements 1820 (e.g., handlers) for changing a display order of the setting menus within the other user interface 130. For example, the display order of the setting menus may be changed via a drag input on the executable elements 1820. For another example, the display order of the setting menus may be changed via a touch input on the executable elements 1820 (e.g., up and down moving object of the executable elements 1820).

For example, the user interface 1610 within the state 1800 may include an item 1830 for applying an arrangement of the setting menus within the other user interface 130 that has been changed via the items 1810.

Referring to FIG. 19, in response to the touch input on a second sub-setting menu 1720, the processor 210 may display a user interface 1610 including items 1910 partially superimposed on the second sub-setting menu 1720, as in a state 1900. For example, a first item 1911 among the items 1910 may be used to display a name (e.g., SAMSUNG KIM) of a user of the electronic device 100 within privacy information 1950 displayed within the other user interface 130, as in a state 1930. For example, a second item 1912 among the items 1910 may be used to display a nickname (e.g., lion) of the user of the electronic device 100 within the privacy information 1950 displayed within the other user interface 130, as in a state 1960.

Referring back to FIG. 16, in response to a touch input on the second setting menu 1612, the processor 210 may display a history in which a value of settings had been adjusted. The history may be exemplified through FIG. 20.

Figure 20:
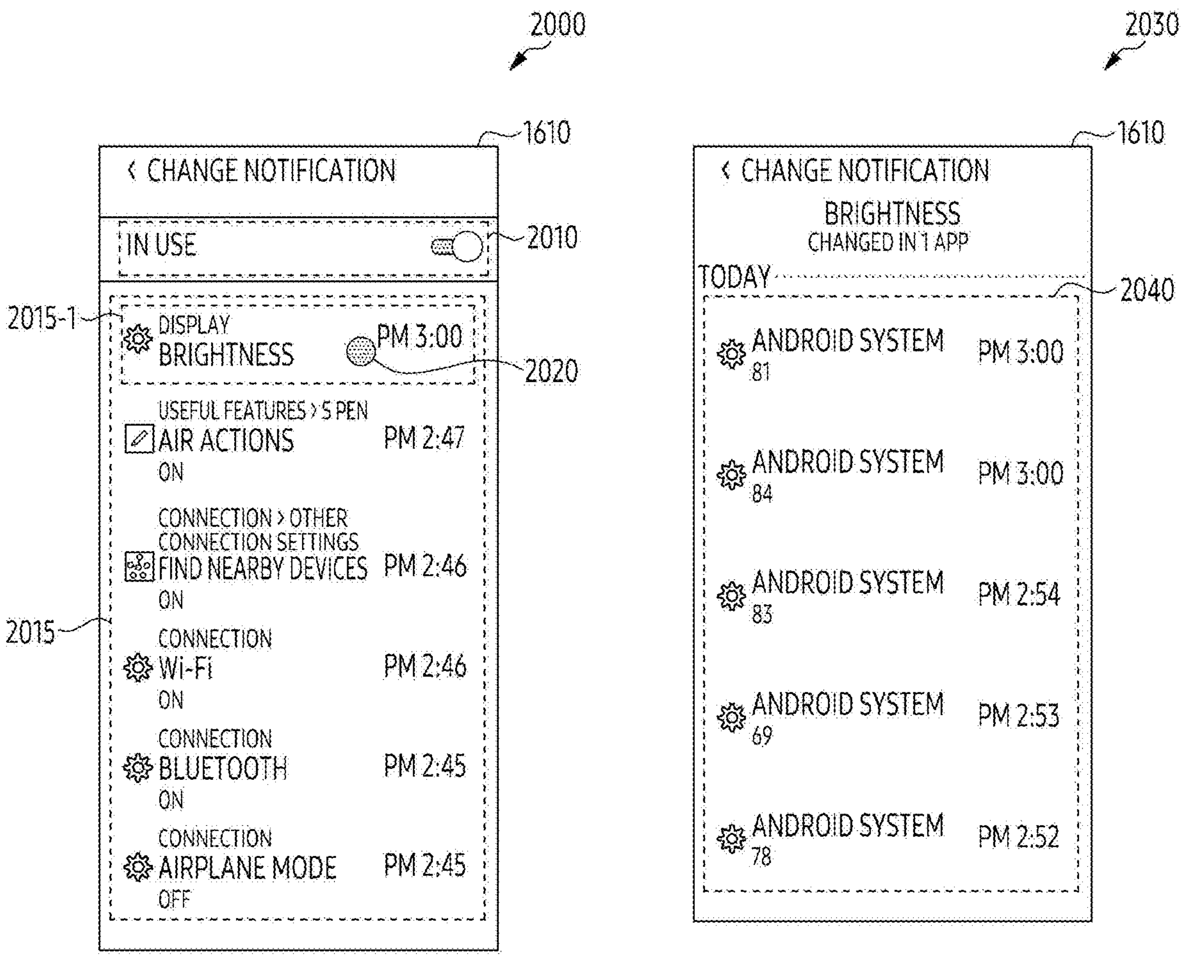
FIG. 20 illustrates an example of another setting menu of a user interface for changing a method of providing a global setting.

FIG. 20 illustrates an example of another setting menu of a user interface for changing a method of providing a global setting.

Referring to FIG. 20, in response to the touch input on the second setting menu 1612, the processor 210 may display, within the user interface 1610, an item 2010 for identifying whether to enable displaying of the history, and items 2015 indicating a history in which the values of the settings had been adjusted, as in a state 2000. For example, each of the items 2015 may include information indicating what setting the value was adjusted (or changed) and information indicating a time at which the value was adjusted. For example, each of the items 2015 may be used to display a history in which the values of each of the settings that had been adjusted were adjusted. For example, the processor 210 may change the state 2000 to a state 2030 in response to a touch input 2020 on an item 2015-1 among the items 2015.

In the state 2030, the processor 210 may display a user interface 1610 that includes a plurality of items 2040 indicating the history in which the value had been adjusted. For example, each of the plurality of items 2040 may provide access to a setting to which the value had been adjusted in response to a touch input.

Referring back to FIG. 16, in response to a touch input on the third setting menu 1613, the processor 210 may display items used to change a method of searching for settings provided via the other user interface 130. The items may be exemplified through FIG. 21.

Figure 21A:
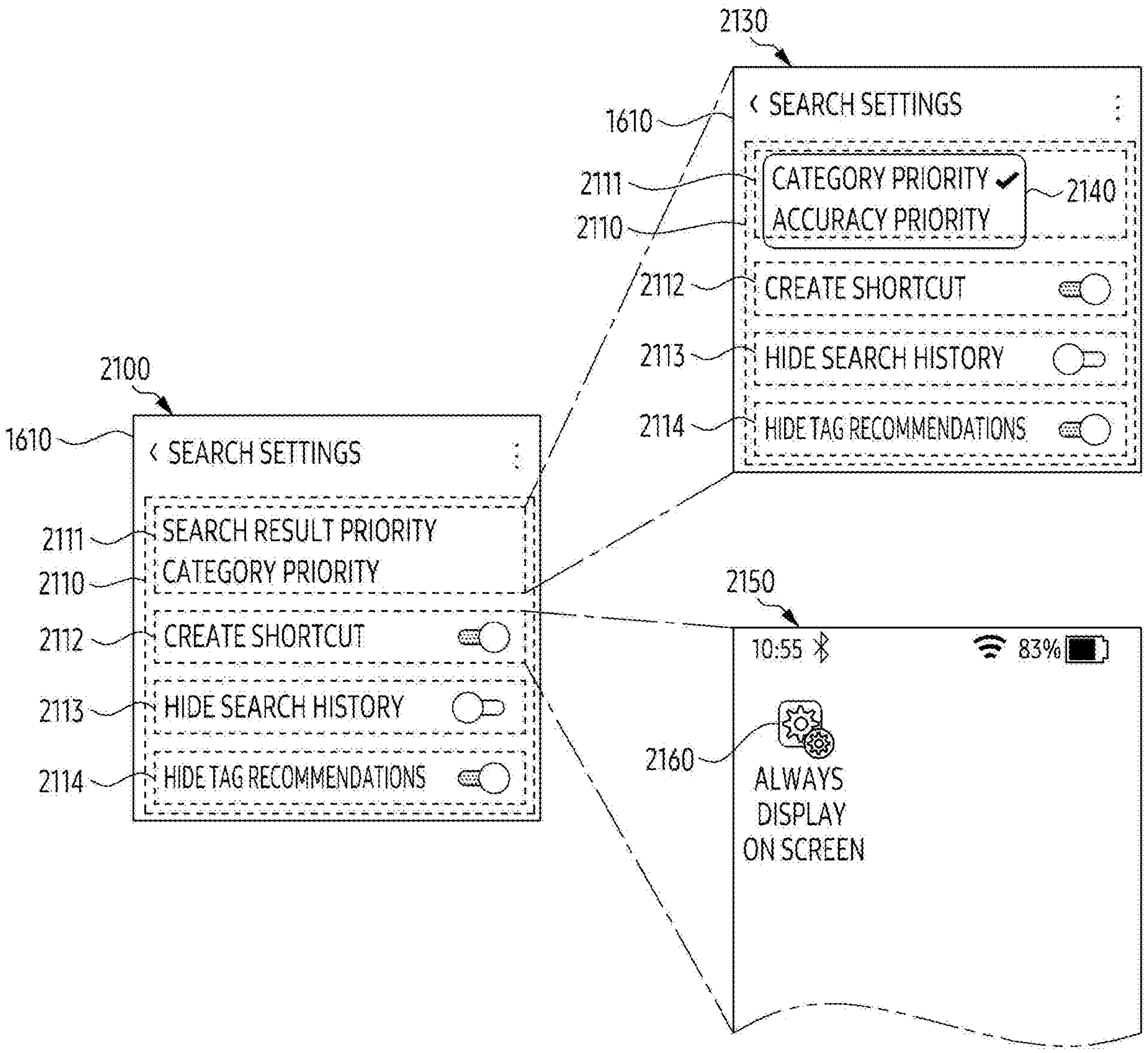
FIG. 21A illustrates an example of still another setting menu of a user interface for changing a method of providing a global setting.

FIG. 21A illustrates an example of still another setting menu of a user interface for changing a method of providing a global setting.

Referring to FIG. 21A, in response to the touch input on the third setting menu 1613, the processor 210 may display a user interface 1610 including items 2110, as in a state 2100. For example, the items 2110 may include a first item 2111 for changing search criteria within the other user interface 130, a second item 2112 for creating a shortcut element for a setting menu (or setting) within the other user interface 130, a third item 2113 for ceasing displaying past search history within the other user interface 130, and a fourth item 2114 for ceasing displaying a recommended tag within the other user interface 130.

For example, the processor 210 may change the state 2100 to a state 2130, in response to a touch input on the first item 2111. For example, in the state 2130, the processor 210 may display, within the user interface 1610, items 2140 that includes an item providing a search result further based on a correlation between a search keyword inputted within the other user interface 130 and setting menus (or sub-setting menus) provided within the other user interface 130 and an item providing a search result further based on consistency between the search keyword inputted within the other user interface 130 and setting menus provided within the other user interface 130, as partially superimposed on the first item 2111.

For example, in response to a touch input on the second item 2112, the processor 210 may enable or disable creating a setting menu, a sub-setting menu, or a shortcut element 2160 for setting, which are provided within the other user interface 130, as in a state 2150. For example, the shortcut element 2160 may be displayed within a home screen. However, it is not limited thereto.

Referring back to FIG. 2, the processor 210 may provide, via the user interface 1610, a feature to access a setting within setting menus for a global setting via a quick panel and/or a widget. Although not illustrated in FIG. 16, a setting menu for the quick panel and/or a setting menu for the widget may be displayed within the user interface 1610 together with the first setting menu 1611, the second setting menu 1612, the third setting menu 1613, and/or the fourth setting menu 1614. The user interface 1610 displayed in response to a user input for the setting menu for the quick panel may be exemplified through FIG. 21B, and a widget obtained via the setting menu for the widget may be exemplified through FIG. 21C.

Figure 21B:
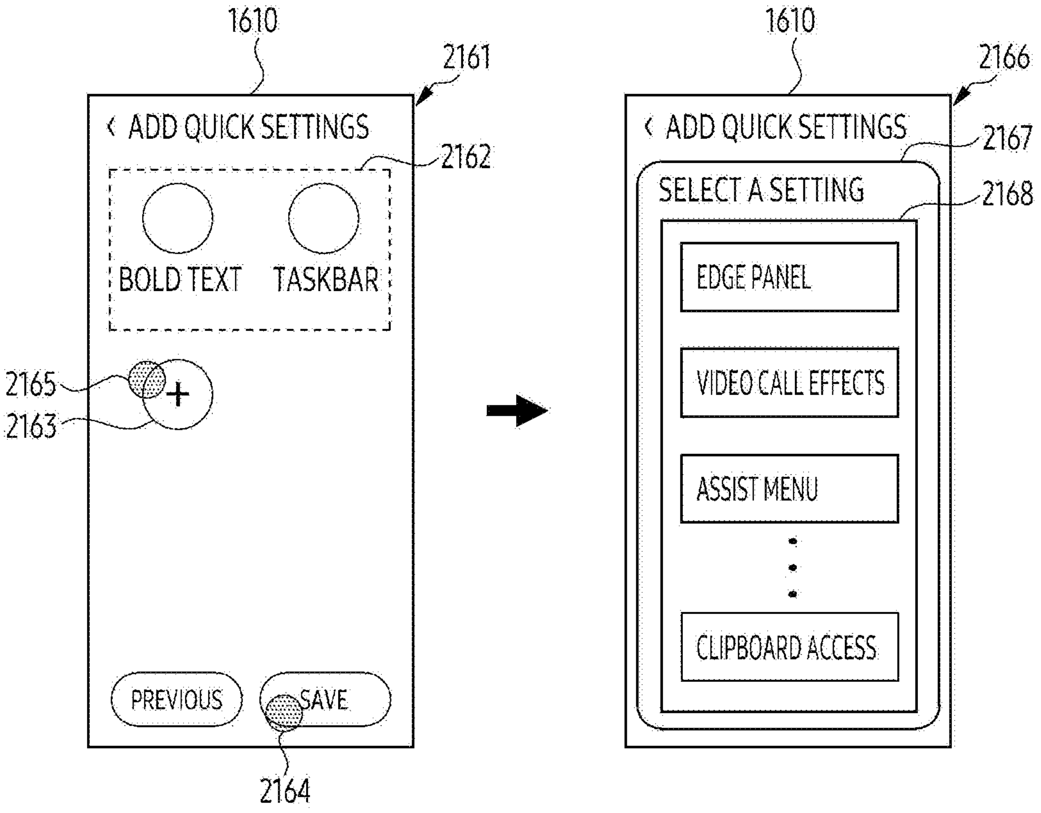
FIG. 21B illustrates an example of a user interface for providing a global setting through a quick panel.

FIG. 21B illustrates an example of a user interface for providing a global setting through a quick panel.

Referring to FIG. 21B, in response to the setting menu for the quick panel, the processor 210 may display a user interface 1610 including at least one object 2162 indicating at least one setting to be included or included within the quick panel and an object 2163 for adding a setting to the quick panel, as in a state 2161. For example, in response to receiving a user input 2164 at the state 2161, the processor 210 may include an object for accessing the at least one setting indicated by at least one object 2162 within the quick panel or executing the at least one setting. For example, in response to receiving a user input 2165 at the state 2161, the processor 210 may display, within the user interface 1610 or on the user interface 1610, a window 2167 including objects 2168 each indicating candidate settings to be added to the quick panel. Although not illustrated in FIG. 21B, in response to a user input indicating to select one of the objects 2168, the processor 210 may display an object corresponding to the object indicated by the user input, together with at least one object 2162 displayed within the state 2161.

Figure 21C:
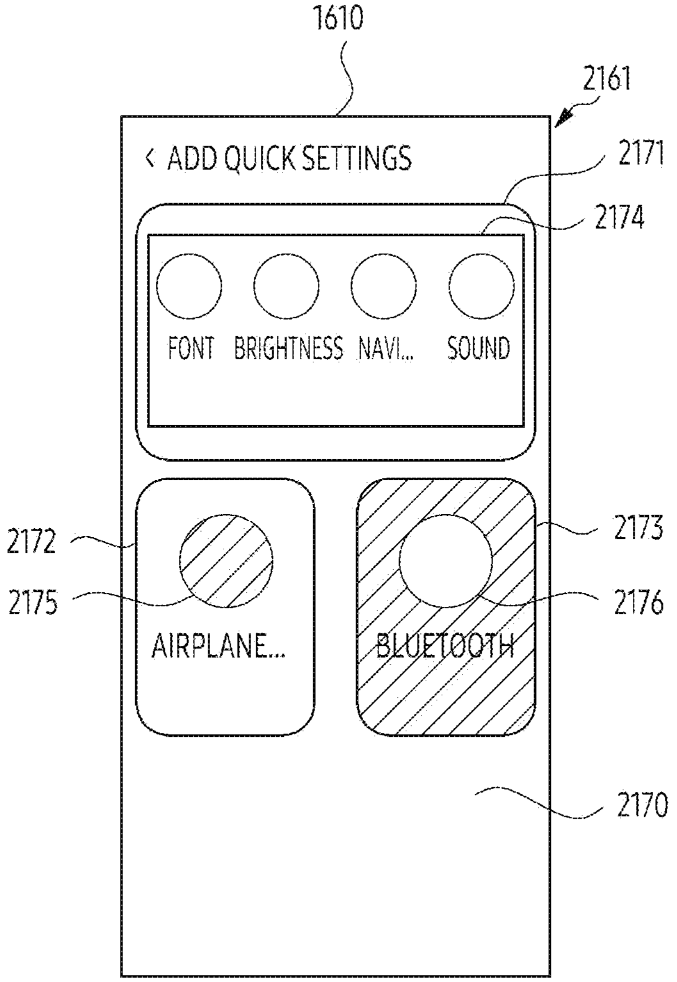
FIG. 21C illustrates an example of a user interface for providing a global setting through a widget.

FIG. 21C illustrates an example of a user interface for providing a global setting through a widget.

Referring to FIG. 21C, the processor 210 may obtain a widget including at least one setting through the setting menu for the widget. For example, the widget may be displayed as a widget 2171, a widget 2172, and a widget 2173 displayed within a wallpaper 2170. For example, the widget may include objects 2174 for accessing each of multiple settings or executing the multiple settings, like the widget 2171. For example, the widget may include an object 2175 (or an object 2176) for accessing a single setting or executing a single setting, like the widget 2172 (or the widget 2173). For example, the maximum number of the objects included in the widget may be changed in accordance with a size of the widget. For example, the size of the widget may be identified through a user input for at least one executable object provided through the setting menu for the widget.

As described above, the electronic device 100 may provide an enhanced user experience by enhancing the usability of the other user interface 130.

Referring back to FIG. 2, the processor 210 may provide a function of providing an external electronic device with information on setting provided through the user interface 120 and/or the other user interfaces 130 (or information on adjusting a value of the setting). For example, the processor 210 may provide the information through a transmission of a quick response (QR) code. However, it is not limited thereto.

The above descriptions include examples of enhancing the usability of global settings through the processor 210, but the processor 210 may enhance usability associated with a setting within a software application within the electronic device 100.

For example, the processor 210 may store a history in which a setting within the software application is changed, based on a period identified based on a user input and/or a predefined period within the electronic device 100, and restore past settings used within the software application based on the stored history.

Figure 22:
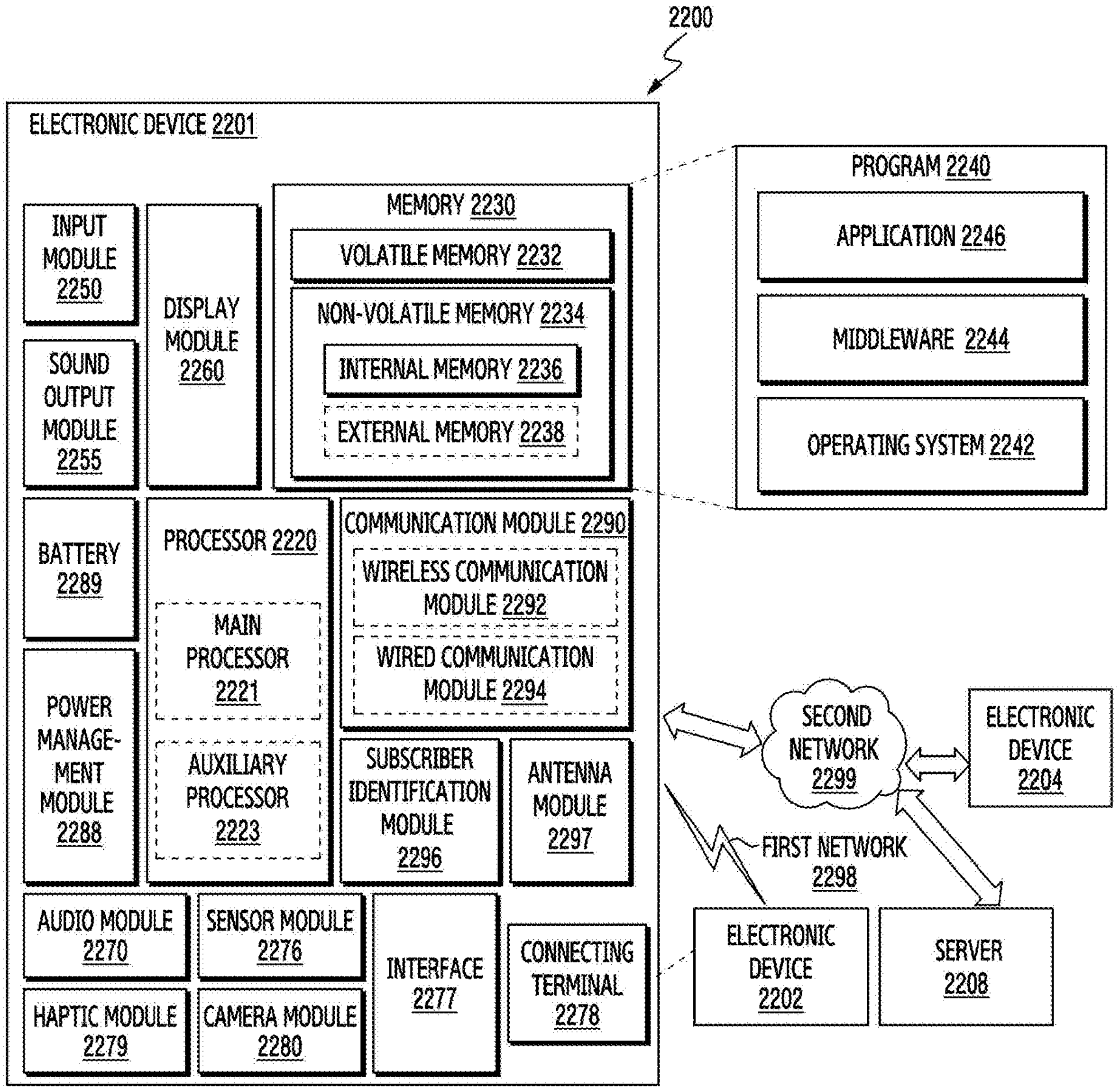
FIG. 22 is a block diagram of an electronic device in a network environment according to various embodiments.

FIG. 22 is a block diagram illustrating an electronic device 2201 in a network environment 2200 according to various embodiments. Referring to FIG. 22, the electronic device 2201 in the network environment 2200 may communicate with an electronic device 2202 via a first network 2298 (e.g., a short-range wireless communication network), or at least one of an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one of the components (e.g., the connecting terminal 2278) may be omitted from the electronic device 2201, or one or more other components may be added in the electronic device 2201. In some embodiments, some of the components (e.g., the sensor module 2276, the camera module 2280, or the antenna module 2297) may be implemented as a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to an embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program

2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by another component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the display, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, an HDMI connector, a USB connector, a SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to an embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™, wireless-fidelity (Wi-Fi) direct, or infrared data association (IrDA)) or the second network 2299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 2264 dB or less) for implementing mMTC, or U-plane latency (e.g., 0.5 ms or less for each of downlink (DL) and uplink (UL), or a round trip of 22 ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element composed of a conductive material or a conductive pattern formed in or on a substrate (e.g., a printed circuit board (PCB)). According to an embodiment, the antenna module 2297 may include a plurality of antennas (e.g., array antennas). In such a case, at least one antenna appropriate for a communication scheme used in the communication network, such as the first network 2298 or the second network 2299, may be selected, for example, by the communication module 2290 (e.g., the wireless communication module 2292) from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

According to various embodiments, the antenna module 2297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or health-care) based on 5G communication technology or IoT-related technology.

As described above, an electronic device 100 may comprise at least one sensor 230, a display 220, and a processor 210. According to an embodiment, the processor 210 may be configured to display, via the display 220, an executable object 320 for displaying a user interface 120 for context-specific setting, as partially superimposed on a screen. According to an embodiment, the processor 210 may be configured to receive an input on the executable object 320. According to an embodiment, the processor 210 may be configured to, in response to the input, identify, from among setting menus for global setting, a setting menu corresponding to a function provided through an object, in the screen, positioned under the executable object 320 or the screen positioned under the executable object 320. According to an embodiment, the processor 210 may be configured to identify a setting corresponding to data obtained via the at least one sensor 230 from among settings in the setting menu. According to an embodiment, the processor 210 may be configured to display, via the display 220, the user interface 120 including an item for adjusting a value of the setting, as partially superimposed on the screen.

According to an embodiment, the processor 210 may be configured to, in response to an input on an item in a quick panel that is displayed as superimposed on the screen in response to a drag input from a periphery of the display 220, display, via the display 220, the executable object 320 partially superimposed on the screen.

According to an embodiment, the processor 210 may be configured to, in response to an input on an item in a panel that is positioned along the periphery of the display 220 as partially superimposed on the screen in response to a drag input from the periphery of the display 220, display, via the display 220, the executable object 320 partially superimposed on the screen.

According to an embodiment, the processor 210 may be configured to, in response to an input on an item in a panel of bar-shaped positioned along a periphery of the display 220, display, via the display 220, the executable object 320 partially superimposed on the screen.

According to an embodiment, the processor 210 may be configured to, in response to identifying changing of a state of a stylus pen capable of causing a touch input via the display 220 while the screen is displayed, display, via the display 220, the executable object 320 partially superimposed on the screen.

According to an embodiment, the changing of the state of the stylus pen may comprise that a button exposed via a portion of a housing of the stylus pen is depressed.

According to an embodiment, the processor 210 may be configured to, in response to a touch input, having an intensity greater than a reference intensity, received while the screen is displayed, display, via the display 220, the executable object 320 partially superimposed on the screen.

According to an embodiment, the executable object 320 may be superimposed on the screen at a position in which the touch input is received.

According to an embodiment, the electronic device 100 may comprise a housing including a side facing in a second direction opposite to a first direction in which the display 220 faces. According to an embodiment, the processor 210 may be configured to, in response to a multiple tapping input received through the side, display, via the display 220, the executable object 320 partially superimposed on the screen.

According to an embodiment, the processor 210 may be configured to, in response to an input depressing a physical button exposed through a portion of a housing of the electronic device 100 such that an end of the physical button moves a distance between a first reference distance and a second reference distance, display, via the display 220, the executable object 320 partially superimposed on the screen.

According to an embodiment, the processor 210 may be configured to, in response to a touch input, received while the screen is displayed, having contact area wider than reference area, display, via the display 220 the executable object 320 partially superimposed on the screen.

According to an embodiment, the processor 210 may be configured to receive a drag input on the executable object 320 partially superimposed on the screen. According to an embodiment, the processor 210 may be configured to, in response to the drag input, move the executable object 320 partially superimposed on the screen to a position where the drag input is released. According to an embodiment, the processor 210 may be configured to receive another input on the executable object 320 moved to the position. According to an embodiment, the processor 210 may be configured to, in response to the another input, identify, from among the setting menus, another setting menu corresponding to a function provided through another object in the screen positioned under the executable object 320 moved to the position. According to an embodiment, the processor 210 may be configured to, identify a setting corresponding to data obtained via the at least one sensor 230 from among settings in the another setting menu. According to an embodiment, the processor 210 may be configured to, display, via the display 220, the user interface 120 including another item for adjusting a value of the setting identified from among the settings in the another setting menu, as superimposed on the screen. According to an embodiment, the input and the another input may be different from a drag input. According to an embodiment, an attribute of the input corresponds to an attribute of the another input.

According to an embodiment, the screen may comprise a lock screen, a screen displayed via the display 220 in a low power state of the electronic device 100, a quick panel, or another user interface 130 of a software application.

According to an embodiment, the processor 210 may be configured to identify the setting menu by identifying a service provided through a software application providing the screen, an execution state of the software application, an arrangement of a plurality of objects in the screen including the object, and a function associated with the object.

According to an embodiment, the processor 210 may be configured to display, together with the item, another item for displaying another user interface 130 for the global setting, including the item, within the user interface 120 at least partially superimposed on the screen.

According to an embodiment, the processor 210 may be configured to, in response to an input for the item, adjust the value from a first value to a second value. According to an embodiment, the processor 210 may be configured to restore the value to the first value, based on identifying a cessation of the displaying of the screen or a change in the data, after the value is adjusted to the second value.

According to an embodiment, the processor 210 may be configured to display, via the display 220, at least one item for displaying a portion of settings that was provided via the user interface 120, together with at least a portion of the setting menus, within another user interface 130 for the global setting. According to an embodiment, the portion of the settings may be identified based on past usage history of the user interface 120.

According to an embodiment, an arrangement of the at least a portion of the setting menus displayed in response to displaying of the other user interface 130 may be changeable based on a user input.

According to an embodiment, displaying of a portion of the setting menus may be excluded from the other user interface 130 based on a user input.

As described above, a method may be executed in an electronic device 100 including at least one sensor 230 and a display 220. According to an embodiment, the method may comprise displaying, via the display 220, an executable object 320 for displaying a user interface 120 for context-specific setting, as partially superimposed on a screen. According to an embodiment, the method may comprise receiving an input on the executable object 320. According to an embodiment, the method may comprise, in response to the input, identifying, from among setting menus for global setting, a setting menu corresponding to a function provided through an object, in the screen, positioned under the executable object 320 or the screen positioned under the executable object 320. According to an embodiment, the method may comprise identifying a setting corresponding to data obtained via the at least one sensor 230 from among settings in the setting menu. According to an embodiment, the method may comprise displaying, via the display 220, the user interface 120 including an item for adjusting a value of the setting, as partially superimposed on the screen.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one sensor;

a display;

at least one processor comprising processing circuitry; and memory comprising one or more storage media storing instructions, wherein the instructions, when executed by the at least one processor, cause the electronic device to:

display, via the display, an executable object for displaying a user interface for context-specific setting, as partially superimposed on a screen;

receive an input on the executable object;

in response to the input, identify, from among setting menus for global setting, a setting menu corresponding to a function provided through an object, in the screen, positioned under the executable object;

identify a setting corresponding to data obtained via the at least one sensor from among settings in the setting menu; and display, via the display, the user interface including an item for adjusting a value of the setting, as partially superimposed on the screen.

2. The electronic device of claim 1, wherein the instructions, when executed by the at least one processor, cause the electronic device to:

in response to an input on an item in a quick panel that is displayed as superimposed on the screen in response to a drag input from a periphery of the display, display, via the display, the executable object partially superimposed on the screen.

3. The electronic device of claim 1, wherein the instructions, when executed by the at least one processor, cause the electronic device to:

in response to an input on an item in a panel that is positioned along thea periphery of the display as partially superimposed on the screen in response to a drag input from the periphery of the display, display, via the display, the executable object partially superimposed on the screen.

4. The electronic device of claim 1, wherein the instructions, when executed by the at least one processor, cause the electronic device to:

in response to an input on an item in a panel of bar-shaped positioned along a periphery of the display, display, via the display, the executable object partially superimposed on the screen.

5. The electronic device of claim 1, wherein the instructions, when executed by the at least one processor, cause the electronic device to:

in response to identifying changing of a state of a stylus pen capable of causing a touch input via the display while the screen is displayed, display, via the display, the executable object partially superimposed on the screen.

6. The electronic device of claim 5, wherein the changing of the state of the stylus pen comprises that a button exposed via a portion of a housing of the stylus pen is depressed.

7. The electronic device of claim 1, wherein the instructions, when executed by the at least one processor, cause the electronic device to:

in response to a touch input, having an intensity greater than a reference intensity, received while the screen is displayed, display, via the display, the executable object partially superimposed on the screen.

8. The electronic device of claim 7, wherein the executable object is superimposed on the screen at a position in which the touch input is received.

9. The electronic device of claim 1, further comprising:

a housing including a side facing in a second direction opposite to a first direction in which the display faces, wherein the instructions, when executed by the at least one processor, cause the electronic device to:

in response to a multiple tapping input received through the side of the housing, display, via the display, the executable object partially superimposed on the screen.

10. The electronic device of claim 1, wherein the instructions, when executed by the at least one processor, cause the electronic device to:

in response to an input depressing a physical button exposed through a portion of a housing of the electronic device such that an end of the physical button moves a distance between a first reference distance and a second reference distance, display, via the display, the executable object partially superimposed on the screen.

11. The electronic device of claim 1, wherein the instructions, when executed by the at least one processor, cause the electronic device to:

in response to a touch input, received while the screen is displayed, having contact area wider than reference area, display, via the display the executable object partially superimposed on the screen.

12. The electronic device of claim 1, wherein the instructions, when executed by the at least one processor, cause the electronic device to:

receive a drag input on the executable object partially superimposed on the screen;

in response to the drag input, move the executable object partially superimposed on the screen to a position where the drag input is released;

receive another input on the executable object moved to the position;

in response to the another input, identify, from among the setting menus, another setting menu corresponding to a function provided through another object in the screen positioned under the executable object moved to the position;

identify a setting corresponding to data obtained via the at least one sensor from among settings in the another setting menu; and display, via the display, the user interface including another item for adjusting a value of the setting identified from among the settings in the another setting menu, as superimposed on the screen, wherein the input and the another input are different from a drag input, and wherein an attribute of the input corresponds to an attribute of the another input.

13. The electronic device of claim 1, wherein the screen comprises a lock screen, a screen displayed via the display in a low power state of the electronic device, a quick panel, or another user interface of a software application.

14. The electronic device of claim 1, wherein the instructions, when executed by the at least one processor, cause the electronic device to:

identify the setting menu by identifying a service provided through a software application providing the screen, an execution state of the software application, an arrangement of a plurality of objects in the screen including the object, and a function associated with the object.

15. The electronic device of claim 1, wherein the instructions, when executed by the at least one processor, cause the electronic device to:

display, together with the item, another item for displaying another user interface for the global setting, including the item, within the user interface at least partially superimposed on the screen.

16. The electronic device of claim 1, wherein the instructions, when executed by the at least one processor, cause the electronic device to:

in response to an input for the item, adjust the value from a first value to a second value; and based on identifying a cessation of the displaying of the screen or a change in the data, after the value is adjusted to the second value, restore the value to the first value.

17. The electronic device of claim 1, wherein the instructions, when executed by the at least one processor, cause the electronic device to display, via the display, at least one item for displaying a portion of settings that was provided via the user interface, together with at least a portion of the setting menus, within another user interface for the global setting, and wherein the portion of the settings may be identified based on past usage history of the user interface.

18. The electronic device of claim 17, wherein an arrangement of the at least a portion of the setting menus displayed in response to displaying of the other user interface is changeable based on a user input.

19. A non-transitory computer readable storage medium storing one or more programs, the one or more programs including instructions, when executed by an electronic device including at least one sensor and a display, to cause the electronic device to:

display, via the display, an executable object for displaying a user interface for context-specific setting, as partially superimposed on a screen;

receive an input on the executable object;

in response to the input, identify, from among setting menus for global setting, a setting menu corresponding to a function provided through an object, in the screen, positioned under the executable object;

identify a setting corresponding to data obtained via the at least one sensor from among settings in the setting menu; and display, via the display, the user interface including an item for adjusting a value of the setting, as partially superimposed on the screen.

20. A method executed in an electronic device including at least one sensor and a display, the method comprising:

displaying, via the display, an executable object for displaying a user interface for context-specific setting, as partially superimposed on a screen;

receiving an input on the executable object;

in response to the input, identifying, from among setting menus for global setting, a setting menu corresponding to a function provided through an object, in the screen, positioned under the executable object;

identifying a setting corresponding to data obtained via the at least one sensor from among settings in the setting menu; and displaying, via the display, the user interface including an item for adjusting a value of the setting, as partially superimposed on the screen.

* * * * *